United States Patent [19]

Moribe et al.

[11] Patent Number: 5,796,712
[45] Date of Patent: Aug. 18, 1998

[54] OPTICAL DISK HAVING IDENTIFICATION SIGNAL RECORDED BETWEEN AND USED IN COMMON FOR TWO MUTUALLY ADJACENT TRACKS AND OPTICAL DISK UNIT THEREFOR

[75] Inventors: Mineo Moribe; Miyozo Maeda; Susumu Satoh; Kyoko Miyabe, all of Kawasaki, Japan

[73] Assignee: Fujitsu Limited, Kawasaki, Japan

[21] Appl. No.: 780,717

[22] Filed: Jan. 8, 1997

Related U.S. Application Data

[63] Continuation of Ser. No. 336,210, Nov. 4, 1994, abandoned, which is a continuation-in-part of Ser. No. 25,637, Mar. 2, 1993, Pat. No. 5,402,411.

[30] Foreign Application Priority Data

| Mar. 5, 1992 | [JP] | Japan | 4-048901 |
| Aug. 27, 1992 | [JP] | Japan | 4-228526 |
| Oct. 20, 1992 | [JP] | Japan | 4-281975 |

[51] Int. Cl.$^6$ .................................................. G11B 7/24
[52] U.S. Cl. ................................. 369/275.4; 369/275.1
[58] Field of Search ........................... 369/275.4, 275.1, 369/275.2, 124, 100, 109, 277, 44.26, 44.28, 44.29, 32, 13, 44.13, 275.3

[56] References Cited

U.S. PATENT DOCUMENTS

| 4,835,756 | 5/1989 | Kaku et al. | 369/109 X |
| 4,858,221 | 8/1989 | Romeas | 369/275.4 |
| 4,985,881 | 1/1991 | Saito et al. | 369/13 |
| 5,204,852 | 4/1993 | Nakagawa et al. | 369/275.1 |
| 5,210,738 | 5/1993 | Iwata et al. | 369/275.1 |
| 5,213,859 | 5/1993 | Aoi et al. | 369/275.1 X |
| 5,214,627 | 5/1993 | Nakashima et al. | 369/32 |
| 5,268,887 | 12/1993 | Honguh et al. | 369/46.13 |
| 5,280,466 | 1/1994 | Tomita | 369/275.1 |
| 5,383,176 | 1/1995 | Inui et al. | 369/275.4 |
| 5,402,411 | 3/1995 | Maeda et al. | 369/275.1 |
| 5,448,552 | 9/1995 | Onagi | 369/275.4 |
| 5,477,524 | 12/1995 | Deguchi et al. | 369/275.1 |

FOREIGN PATENT DOCUMENTS

| 60-170042 | 9/1985 | Japan. |
| 61-68742 | 4/1986 | Japan. |
| 62-164626 | 10/1987 | Japan. |
| 2-73549 | 8/1988 | Japan. |
| 4195939 | 7/1992 | Japan. |

OTHER PUBLICATIONS

Patent Abstracts of Japan, vol. 10, No. 237, Aug. 15, 1986—JP61068742.
Patent Abstracts of Japan, vol. 9, No. 137, 12 Jun. 1985—JP60018832.
Patent Abstracts of Japan, vol. 10, No. 180, Jun. 24, 1986—JP61029423.

*Primary Examiner*—Ali Neyzari
*Attorney, Agent, or Firm*—Armstrong, Westerman, Hattori, McLeland & Naughton

[57] ABSTRACT

An optical disk is made up of a disk-shaped substrate having a surface, a first track and a second track provided on the surface of the substrate, where the first and second tracks are two mutually adjacent concentric tracks or two mutually adjacent track turns of a single spiral track, the first track extends along a first center line and the second track extends along a second center line, and an identification signal recording part extending along a third center line and prerecorded with an identification signal including at least a sector number and a track number for identifying a position on the optical disk. The third center line is arranged between the first and second center lines, and the identification signal prerecorded in the identification signal recording part is common to the first and second tracks on both sides of the identification signal recording part.

26 Claims, 38 Drawing Sheets

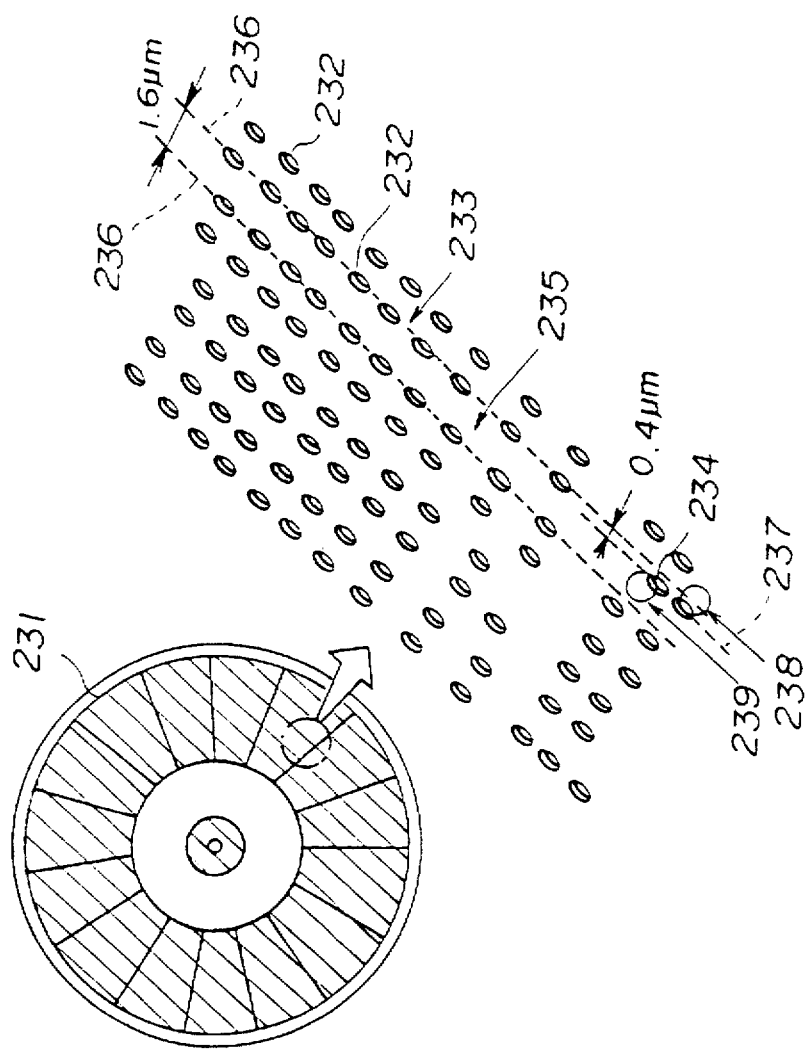

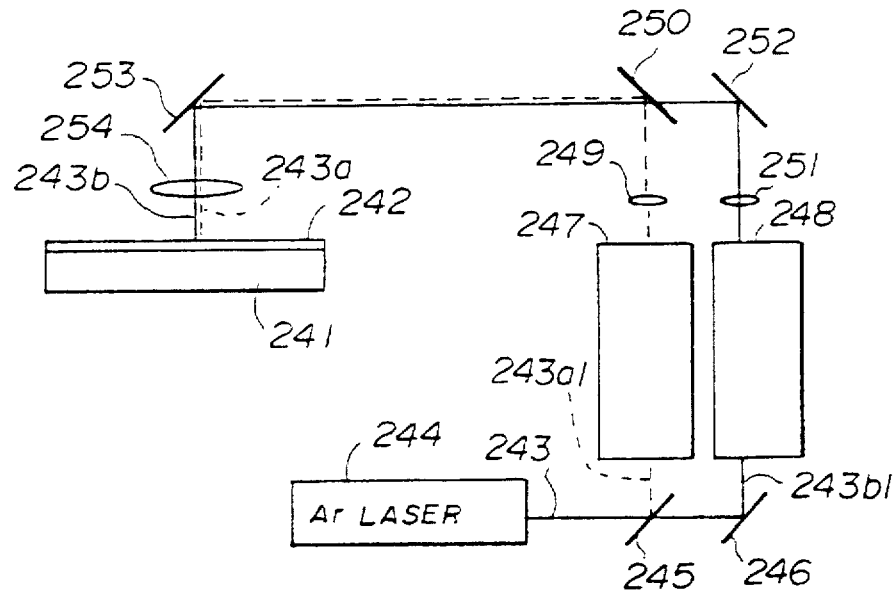
FIG. 19A
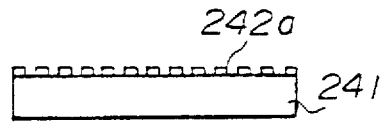
FIG. 19B
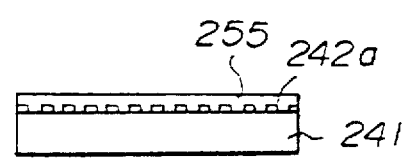
FIG. 19C
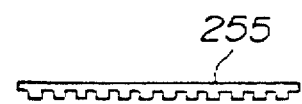
FIG. 19D
FIG. 19E
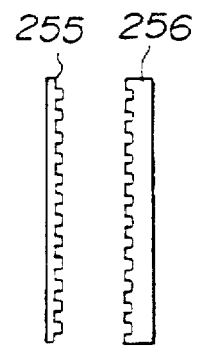

FIG. 30

| EMBODIMENT | FIGURE | DISK | SM WRITE REGION | | ID WRITE REGION | |
|---|---|---|---|---|---|---|
| | | | TRACK T2 | TRACK T1 | TRACK T2 | TRACK T1 |
| 6TH | FIG. 23 | 360 | PIT 366 | MAGNETO-OPTIC 367 | PIT 370 | MAGNETO-OPTIC 371 |
| 7TH | FIG. 26 | 360A | PIT 366A | MAGNETO-OPTIC 367 | PIT 370A | MAGNETO-OPTIC 371 |
| 8TH | FIG. 27 | 390 | (GUIDE GROOVE) MAGNETO-OPTIC 394 | (LAND) PIT 393 | (GUIDE GROOVE) MAGNETO-OPTIC 395 | (LAND) PIT 396 |
| 9TH | FIG. 28 | 360B | PIT 366 | PIT 366 | PIT 370 | MAGNETO-OPTIC 371 |
| 10TH | FIG. 29 | 390A | PIT 393 | PIT 393 | MAGNETO-OPTIC 395 | PIT 396 |

FIG. 31

| EMBODIMENT | FIGURE | DISK | ID WRITE REGION | | DATA WRITE REGION |
|---|---|---|---|---|---|
| | | | PIT TO-MAGNETO-OPTIC CROSSTALK (dB) | MAGNETO-OPTIC-TO-PIT CROSSTALK (dB) | MAGNETO-OPTIC-TO-MAGNETO-OPTIC CROSSTALK (dB) |
| 6TH | FIG. 23 | 360 | -33 | -40 | -34 |
| 7TH | FIG. 26 | 360A | -29 | -41 | -32 |
| 8TH | FIG. 27 | 390 | -34 | -43 | -33 |
| 9TH | FIG. 28 | 360B | -32 | -41 | -34 |
| 10TH | FIG. 29 | 390A | -34 | -42 | -33 |

5,796,712

1

OPTICAL DISK HAVING IDENTIFICATION SIGNAL RECORDED BETWEEN AND USED IN COMMON FOR TWO MUTUALLY ADJACENT TRACKS AND OPTICAL DISK UNIT THEREFOR

This application is a continuation of U.S. application Ser. No. 08/336,210 filed Nov. 4, 1994, now abandoned, which is a continuation-in-part application of a U.S. patent application Ser. No.025,637 entitled "OPTICAL DISK, OPTICAL DISK UNIT AND OPTICAL DISK PRODUCING METHOD" and filed Mar. 2, 1993, now U.S. Pat. No. 5,402,411.

BACKGROUND OF THE INVENTION

The present invention generally relates to optical disks, optical disk units and optical disk producing methods, and more particularly to an optical disk which has land regions for writing information arranged intermittently in a radial direction of the optical disk and also writes information in a region between the land regions. The present invention also relates to an optical disk unit which writes and reads information to and from such an optical disk, and to an optical disk producing method for producing such an optical disk.

Generally, optical disks can roughly be divided into three kinds, namely, the so-called ROM optical disks, write once optical disks, and rewritable optical disks. The ROM optical disk is typified by a compact disk (CD) and the CD-ROM. The write once optical disk is primarily used in filing systems which process image information, and can write information only once but the written information can be read many times. On the other hand, the rewritable optical disk can treat code information, and the information can be written, erased and read many times.

However, the so-called partial ROM (P-ROM) optical disk has also been proposed. This P-ROM optical disk has a region which is exclusively for reading and is written with information such as a program, and a region which is used to write and read information such as data which require rewriting. Hence, the P-ROM optical disk has the functions of both the ROM optical disk and the rewritable optical disk. In such a P-ROM optical disk, there are demands to write information with a high density and to accurately read the written information, so as to further improve the performance and capacity of the optical disk.

FIGS. 1A and 1B show an example of a conventional optical disk, where FIG. 1A shows a perspective view of the optical disk and FIG. 1B shows an encircled portion of the optical disk in FIG. 1A on an enlarged scale.

A P-ROM optical disk 1 shown in FIG. 1A has a region (hereinafter referred to as a ROM region) 2 exclusively for reading, and a region (hereinafter referred to as a write region) 3 which is used to write and read information. The write region 3 includes a region 3a to which the user can arbitrarily write information and from which the user can arbitrarily read the written information, and a preformat region 3b which is provided at periodic positions. This preformat region 3b is preformed during the disk production stage in the form of pits, and indicates an identification (ID) signal such as the track number and the sector number.

A recording layer 6 is formed on a substrate 5 as shown in FIG. 1B. A head guide groove 7 for tracking a light spot of an optical head (not shown) to scan a predetermined track is also formed on the optical disk 1. The head guide groove 7 may be made up of a single spiral groove or concentric grooves. In FIG. 1B, R indicates the disk rotating direction.

2

A land part 8 is formed between two head guide grooves 7 which are mutually adjacent in the radial direction of the optical disk 1. A pit sequence made up of intermittent pits 9 are preformed in the land part 8 of the ROM region 2 during the disk production stage. This pit sequence relates to information which does not need to be rewritten, such as programs, images and character fonts. After the disk production stage, arbitrary information is written on the recording layer 6 of the write region 3 by the user as an arrangement of the magnetization directions, and not in the form of pits.

FIGS. 2A and 2B show another example of a conventional optical disk, where FIG. 2A shows a perspective view of the optical disk and FIG. 2B shows a part of the optical disk in FIG. 2A on an enlarged scale.

An optical disk 10 shown in FIG. 2A has a write surface 11 with a write region 11a. A spiral track or concentric tracks are preformed on the write region 11a, and a region which may be used for writing and reading is provided between two mutually adjacent preformed tracks. This optical disk 10 is proposed in a Japanese Laid-Open Patent Application No.61-178752, for example.

As shown in FIG. 2B, the write region 11a includes a preformed track which is made up of intermittent pits 12 and is written with ROM (readonly) information exclusively for reading, and a flat writable region which is formed on the recording layer 6 between two mutually adjacent preformed tracks. The preformed track is not limited to the intermittent pits 12. For example, a Japanese Laid-Open Patent Application No.61-68742 proposes a preformed track which is formed by a transition from amorphous to crystal state.

The optical disk 1 shown in FIGS. 1A and 1B has the ROM region 2 provided in a part of the write area of the optical disk 1. For this reason, the write region 3 is reduced by an amount corresponding to the ROM region 2. On the other hand, the optical disk 10 shown in FIGS. 2A and 2B can provide a larger write region compared to the optical disk 1, because the intermittent pits 12 which describe the ROM information is used to obtain a tracking error signal when writing information to and reading information from the recording layer 6.

But the intervals of the pits 12 change at random depending on the ROM information, and thus, the amplitude of the tracking error signal which is obtained from the pits 12 changes at random depending on the information content. For example, if a signal obtained by (2, 7) modulation of data is written as a sequence of intermittent pits 12, the amplitude of the tracking error signal which is obtained from the pits 12 decreases as the interval of the pits 12 increases. As a result, the amplitude of the tracking error signal for a minimum pit interval (mark interval) $1.5\zeta$ of the signal which is obtained by the (2, 7) modulation and the amplitude for a maximum pit interval (mark interval) $4\zeta$ differ by approximately 3.5 times as may be seen from FIG. 3, where $\zeta$ indicates the pit interval which corresponds to the bit period of the data. Therefore, the tracking error signal cannot be stably obtained from the optical disk 10, and there is a problem in that an accurate tracking control cannot be made.

In addition, no ID signal is written on the optical disk 10. For this reason, there is a problem in that it is difficult to quickly search a desired position on the optical disk 10 when writing, erasing or reading the information.

Moreover, if the optical disk 10 is loaded into an existing optical disk unit which is designed to read information from the optical disk 1 by tracking the land part 8, the tracking will be made to the write region 11a of the optical disk 10 and it will be impossible to read the ROM information from the optical disk 10.

Next, a description will be given of the ID signal. In the optical disk 1 shown in FIGS. 1A and 1B, a sector mark (SM) and an ID (address) are written in each preformat region 3b which precedes the region 3a of the write region 3. FIG. 4 shows a part of the optical disk 1 in a vicinity of the preformat region 3b on an enlarged scale, and FIG. 5 shows a part of FIG. 4 on an enlarged scale. In FIGS. 4 and 5, those parts which are the same as those corresponding parts in FIGS. 1A and 1B are designated by the same reference numerals, and a description thereof will be omitted.

As shown in FIGS. 4 and 5, the land part 8 between two mutually adjacent guide grooves 7 forms a track T, and the guide groove 7 does not form a track. For example, an interval a between two mutually adjacent guide grooves 7 is 1.6 μm, a width b of the guide groove 7 is 0.6 μm, and a depth c of the guide groove 7 is 60 nm in FIG. 5.

The data is written in the region 3a as a change in the direction of perpendicular magnetization, that is, by the magneto-optic recording. On the other hand, an SM pit sequence 15 is formed at the head of the preformat region 3b, and an ID pit sequence 16 is formed in the preformat region 3b following the SM pit sequence 15.

The SM pit sequence 15 is provided to indicate that the ID follows this SM pit sequence 15. For this reason, the SM pit sequence 15 has the same pattern for all of the tracks T, and the crosstalk of the SM pit sequences 15 between the mutually adjacent tracks T does not become a problem. On the other hand, the ID pit sequence 16 indicates the track number, and the pattern of the ID pit sequence 16 differs for each track T. Accordingly, the crosstalk of the ID pit sequences 16 between the mutually adjacent tracks T becomes a problem.

Next, a description will be given of an optical disk unit for playing the optical disk 1, by referring to FIG. 6.

An optical disk unit 20 generally includes an optical head 21, a tracking servo circuit 35, a demodulator 41, an SM detector 43, an ID detector 44, and a controller 45 which are connected as shown in FIG. 6.

In the optical head 21, a laser beam which is emitted from a semiconductor laser 22 passes through a collimator lens 23 and a beam splitter 24 and is converged on the optical disk 1 by an objective lens 25 as a spot 26. The laser beam is reflected by the optical disk 1 and is directed towards a λ/2 plate 27. The reflected beam passing through the λ/2 plate is split into two beams by a polarization beam splitter 28. One beam from the polarization beam splitter 28 is converged on a photodetector 30 via a lens 29, and the other beam is converged on a split photodetector 32 via a lens 31.

A difference between an output of the photodetector 30 and an output of the split photodetector 32 is obtained via a differential amplifier 33, and a magneto-optic signal 40 is output from the differential amplifier 33. This magneto-optic signal 40 is obtained by reading the information which is written as a change in the direction of perpendicular magnetization by use of the change in the rotation of the polarization plane. On the other hand, a sum of the output of the photodetector 30 and the output of the split photodetector 32 is obtained via an amplifier 34, and a reflectance signal 42 is output from the amplifier 34. This reflectance signal 42 is obtained by reading the information (SM and ID) which is written as pit sequences by use of the change in the reflectance.

On the other hand, a differential amplifier 36 which forms the tracking servo circuit 35 obtains a difference of outputs from each of light receiving parts of the split photodetector 32, and outputs a tracking error signal. This tracking error signal is supplied to a tracking actuator 37 so as to carry out the tracking control.

As described above, the land part 8 of the optical disk 1 forms the track T, and the relationship between the output level of the tracking control signal with respect to the amount of tracking error becomes as indicated by a curve I in FIG. 7.

The magneto-optic signal 40 described above is supplied to the demodulator 40 which outputs a read signal. On the other hand, the reflectance signal 42 described above is supplied to the SM detector 43 and the ID detector 44. An output of the ID detector 44 is supplied to the demodulator 41 and the controller 45.

Next, a description will be given of a case where the spot 26 relatively scans the preformat region 3b and then the region 3a in FIG. 4.

In this case, the reflectance signal 42 is first output from the amplifier 34, and the SM detector 43 detects the SM in response to this reflectance signal 42. Then, responsive to the output of the SM detector 43, the ID detector 44 is made active and detects the ID.

When the ID detector 44 detects the ID, the demodulator 41 is made active in response to the output of the ID detector 44. Hence, the demodulator 41 demodulates the magneto-optic signal 40 which is output from the differential amplifier 33 following to the reflectance signal 42, and outputs the read signal which is related to the data written in the region 3a. On the other hand, the output of the ID detector 44 is also supplied to the controller 45, and the controller 45 controls the entire operation of the optical disk unit 20.

As described above, only the land part 8 between the two mutually adjacent guide grooves 7 is used as the track T, and the storage capacity of the optical disk 1 cannot be further improved notably. Hence, it is conceivable to apply the concept proposed in a Japanese Laid-Open Patent Application No.60-18832 to the optical disk 1 in order to further improve the storage capacity. More particularly, it is conceivable to utilize the guide groove portion as a track in addition to the land part.

FIG. 8 shows an important part of a conceivable optical disk 1A which is based on the above application. In FIG. 8, a land part 52 forms a track T, and a guide groove 53 also forms a track T. The data is written in a data region 54, and the ID is written in an ID region 55 in the form of an ID pit sequence 56.

Compared to the conventional optical disk 1, the data storage capacity of the conceivable optical disk 1A is approximately doubled. In addition, the data is written in the data region 54 by the magneto-optic recording, and the crosstalk from the track T which is adjacent to the target track T which is to be read was approximately −32 dB in the data region 54, thereby introducing no problem from the practical point of view. The present inventors have found that errors increase considerably if the crosstalk becomes approximately −24 dB.

On the other hand, in the ID region 55, the crosstalk from the track T which is adjacent to the target track T which is to be read was approximately −13 dB and large. As a result, the ID of the target track T could not be read correctly, and there was a problem in that errors were introduced in the read data.

An optical disk having pits formed in a guide groove has been proposed in a Japanese Laid-Open Patent Application No.2-73549. The pits are formed in the guide groove to improve the recording capacity. However, the Japanese Laid-Open Patent Application No.2-73549 does not contain any disclosure related to an ID signal. Furthermore, no specific relationship is disclosed between the depth of the guide groove and the depth of the pits. But if the depths are not optimized, the tracking error signal amplitude will fluctuate and will result in an inaccurate tracking control depending on the intervals of the pits, similarly to the case of the optical disk 10 having no guide groove. The necessity to optimize the depths of the guide groove and the pits will be apparent from the following description when read in conjunction with the accompanying drawings.

SUMMARY OF THE INVENTION

Accordingly, it is a general object of the present invention to provide a novel and useful optical disk, optical disk unit and optical disk producing method, in which the problems described above are eliminated.

Another and more specific object of the present invention is to provide an optical disk adapted for use in an optical disk unit which irradiates a light beam spot on a target track on the optical disk and controls tracking of the light beam spot based on a tracking error signal which is generated based on a reflected light beam from the optical disk, where the optical disk comprises a disk shaped substrate, a spiral or concentric guide tracks provided on the substrate, a writable region provided on the substrate between two mutually adjacent track turns of the guide track, and a preformed track provided within the guide track and prerecorded with read-only information in a form of variations of a topological feature, where the guide track and the topological feature have mutually different height positions so that a tracking error signal which is generated when the light beam spot scans the guide track has the same amplitude as a tracking error signal which is generated when the light beam spot scans the preformed track, and the height positions of the guide track and the topological feature are different from a height position which generates a maximum tracking error signal amplitude when scanned by the light beam spot. According to the optical disk of the present invention, it is possible to make the tracking error signal amplitude constant regardless of the interval with which the read-only information is prerecorded as a sequence of intermittent pits or projections. For this reason, it is possible to stably and accurately carry out the tracking control with respect to the preformed track. In addition, because the read-only information can be recorded in the guide track, it is possible to increase the writable region by the amount which would otherwise be occupied by a read-only region, and the information recording density of the optical disk can be improved.

Still another object of the present invention is to provide an optical disk adapted for use in an optical disk unit which irradiates a light beam spot on a target track on the optical disk, where the optical disk comprises a disk shaped substrate, a spiral or concentric first tracks provided on the substrate and prerecorded with read-only information in a form of variations of topological feature, a second track provided between two mutually adjacent track turns of the first track and including a writable region which enables writing, erasing and reading of information, and a path parallel to the first track and prerecorded with an identification signal for identifying a position on the optical disk in a form of variations of topological feature, where the path is located at a position so that the light beam spot which scans either one of the first track and the second track simultaneously scans the topological feature of the identification signal. According to the optical disk of the present invention, it is possible to improve the recording density of the information which is arbitrarily written by the user and the read-only information which is prerecorded on the optical disk beforehand. In addition, it becomes possible to quickly search a desired position on the optical disk when carrying out a write, erase or read operation. Furthermore, the read-only information can be read on an optical disk unit which is designed to read signals by tracking a land part of the optical disk.

A further object of the present invention is to provide an optical disk comprising a disk shaped substrate having a substrate surface which is divided into a plurality of sectors, a spiral or concentric first tracks provided on the substrate, a second track provided on the substrate between two mutually adjacent track turns of the first track, where the second track has a height which is different from that of the first track relative to a height of the substrate surface, a data write region provided in the sector for writing data by magneto-optic recording, and an address write region provided in the sector and prerecorded with address information for identifying a position on the optical disk, where the address information prerecorded on the first track within the address write region and the address information prerecorded on the second track within the address write region are prerecorded according to mutually different recording techniques. According to the optical disk of the present invention, it is possible to improve the recording density of the optical disk while guaranteeing correct and stable reading of the address information.

Another object of the present invention is to provide an optical disk producing method for producing an optical disk comprising a spiral or concentric first tracks provided on a substrate and prerecorded with read-only information in a form of variations of topological feature, a second track provided between two mutually adjacent track turns of the first track and including a writable region which enables writing, erasing and reading of information, and a path parallel to the first track and prerecorded with an identification signal for identifying a position on the optical disk in a form of variations of topological feature. The optical disk producing method comprises the steps of (a) forming a photoresist on a disk shaped substrate, (b) exposing patterns corresponding to variations of the topological features describing the read-only information and the identification signal which are to be prerecorded on the optical disk by irradiating two laser beams on the photoresist, where the two laser beams on the photoresist form beam spots having centers thereof separated by a distance corresponding to ¼ a distance between two mutually adjacent track turns of the first track, (c) developing the photoresist, (d) plating a metal on the developed surface of the disk shaped substrate and removing the plated metal to obtain a stamper, and (e) molding a light transmitting material using the stamper.

Still another object of the present invention is to provide an optical disk unit for writing and reading information to and from an optical disk which comprises a disk shaped substrate, a spiral or concentric guide tracks provided on the substrate, a writable region provided on the substrate between two mutually adjacent track turns of the guide track, and a preformed track provided within the guide track and prerecorded with read-only information in a form of variations of a topological feature, where the guide track and the topological feature have mutually different height positions so that a tracking error signal which is generated when a light beam spot scans the guide track has the same amplitude as a tracking error signal which is generated when the light beam spot scans the preformed track, and the height positions of the guide track and the topological feature are different from a height position which generates a maximum tracking error signal amplitude when scanned by the light beam spot. The optical disk unit comprises write means for writing arbitrary information in the writable region of the optical disk by irradiating a light beam which has a light intensity modulated by the arbitrary information, tracking error signal generating means for generating a tracking error signal from a reflected light beam which is obtained from the optical disk when the light beam irradiates the optical disk, selecting means, coupled to the tracking error signal generating means, for selectively outputting the tracking error signal from the tracking error signal generating means with the same phase or with an inverted phase, tracking control means, coupled to the selecting means, for moving the light beam based on the tracking error signal so as to move the light beam spot in a radial direction of the optical disk, and read means for reading the arbitrary information from the writable region of the optical disk and the read-only information from the preformed track of the optical disk based on the reflected light beam from the optical disk, where the tracking control means moves the light beam spot to selectively track the writable region or the guide track and the preformed track responsive to the tracking error signal output from the selecting means. According to the optical disk unit of the present invention, it is possible to selectively track the writable region or the preformed track. Therefore, it is possible to selectively write and read arbitrary information to and from the writable region or read the read-only information from the preformed track.

A further object of the present invention is to provide an optical disk unit for reading and writing information to and from an optical disk which comprises a disk shaped substrate having a substrate surface which is divided into a plurality of sectors, a spiral or concentric first tracks provided on the substrate, a second track provided on the substrate between two mutually adjacent track turns of the first track and having a height which is different from that of the first track relative to a height of the substrate surface, a data write region provided in the sector for writing data by magneto-optic recording, and an address write region provided in the sector and prerecorded with address information for identifying a position on the optical disk, where the address information prerecorded on the first track within the address write region and the address information prerecorded on the second track within the address write region are prerecorded according to mutually different recording techniques. The optical disk unit comprises optical head means for relatively scanning the first track of the optical disk to obtain a first read signal according to a first recording technique, and for relatively scanning the second track of the optical disk to obtain a second read signal according to a second recording technique which is different from the first recording technique, address detector means for detecting an address from a read signal, and control means for selectively supplying one of the first and second read signals output from the optical head means to the address detector means. According to the optical disk unit of the present invention, it is possible to write and read data to and from an optical disk which has the improved recording density in a satisfactory manner, that is, without error.

Another object of the present invention is to provide an optical disk comprising a disk-shaped substrate having a surface, a first track and a second track provided on the surface of the substrate, where the first and second tracks are two mutually adjacent concentric tracks or two mutually adjacent track turns of a single spiral track, the first track extends along a first center line and the second track extends along a second center line, and an identification signal recording part extending along a third center line and prerecorded with an identification signal including at least a sector number and a track number for identifying a position on the optical disk, where the third center line is arranged between the first and second center lines, and the identification signal prerecorded in the identification signal recording part is common to the first and second tracks on both sides of the identification signal recording part. According to the optical disk of the present invention, it is possible to reduce the pitch between the first and second tracks, and thus improve the recording density on the optical disk.

Still another object of the present invention is to provide an optical disk unit adapted to write and read information to and from an optical disk having a disk-shaped substrate, a first track and a second track provided on a surface of the substrate and formed by two mutually adjacent concentric tracks or two mutually adjacent track turns of a single spiral track, and an identification signal recording part provided between the first and second tracks and prerecorded with an identification signal including at least a sector number and a track number for identifying a position on the optical disk, where the identification signal prerecorded in the identification signal recording part is common to the first and second tracks on both sides of the identification signal recording part, and the optical disk unit comprises first means for detecting the identification signal from the optical disk, second means for determining whether a scanned track is a the first track or a the second track, and third means for adding an identification information to the identification signal detected by the first means based on the scanned track determined by the second means. According to the optical disk unit of the present invention, it is possible to detect the exact track and sector position on the optical disk even though the identification signal is prerecorded for use in common between the first and second tracks. Hence, it is possible to satisfactorily play the optical disk having a high recording density.

Other objects and further features of the present invention will be apparent from the following detailed description when read in conjunction with the accompanying drawings.

BRIEF DESCRIPTION OF THE DRAWINGS

FIGS. 18A and 18B respectively are a plan view and a perspective view showing a third embodiment of the optical disk according to the present invention;

FIGS. 19A, 19B, 19C, 19D and 19E respectively are cross sectional views for explaining the steps of a second embodiment of the optical disk producing method according to the present invention;

FIG. 30 is a diagram showing the recording formats of the sixth through tenth embodiments of the optical disk;

FIG. 31 is a diagram showing the crosstalks of the sixth through tenth embodiments of the optical disk;

DESCRIPTION OF THE PREFERRED EMBODIMENTS

Figure 9:
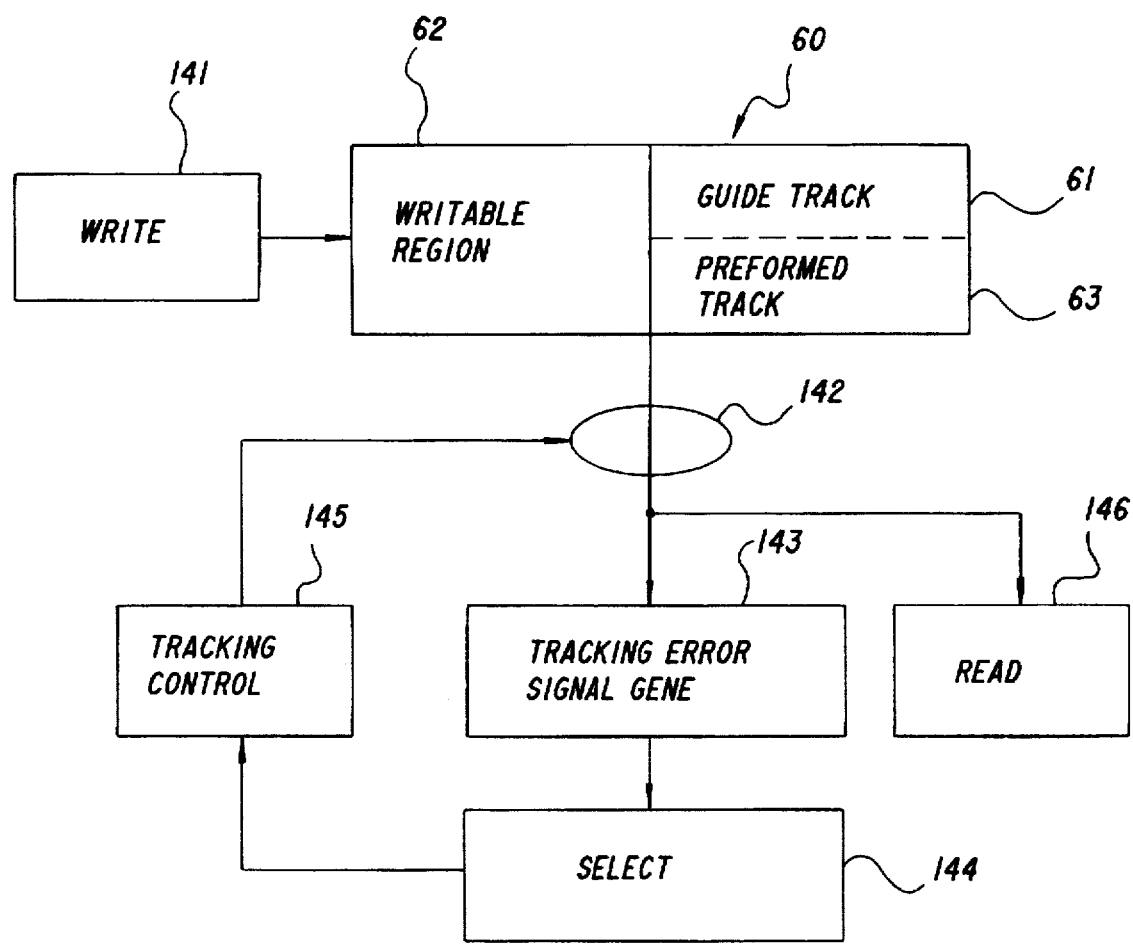
FIG. 9 is a system block diagram for explaining the operating principle of the present invention according to one aspect thereof.
Figures 10A, 10B:
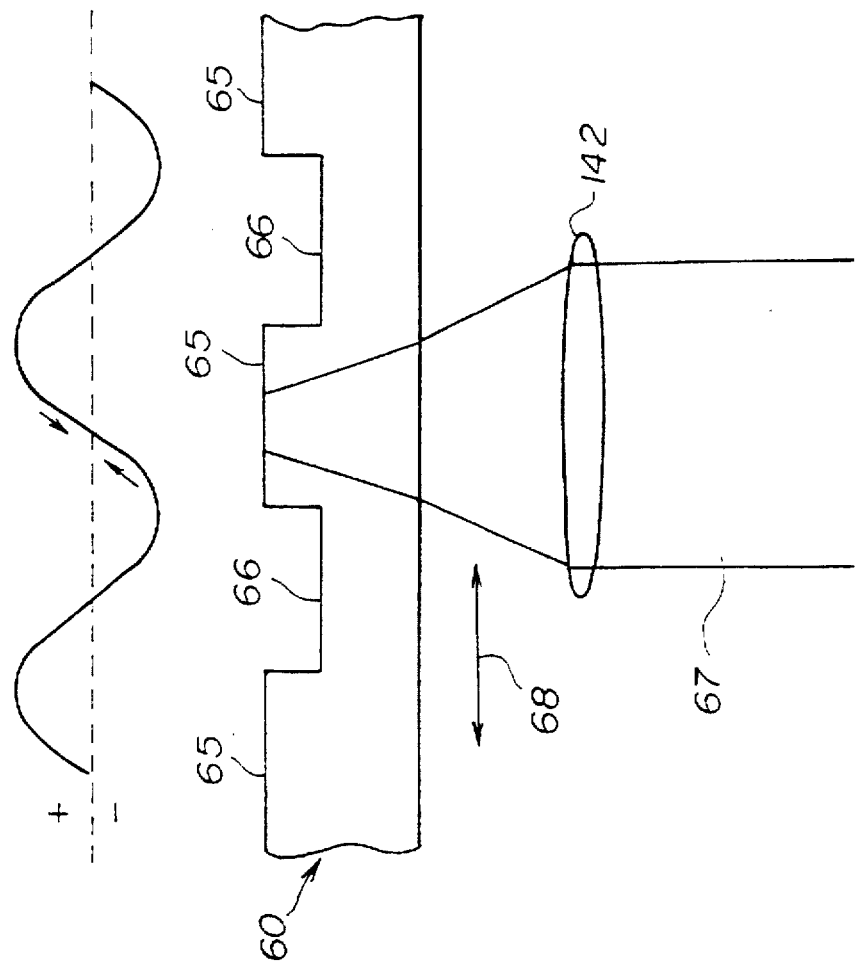
FIGS. 10A and 10B respectively are diagrams showing a tracking error signal and a portion of an optical disk for explaining the tracking control.

First, a description will be given of one aspect of the present invention, by referring to FIGS. 9, 10A and 10B. FIGS. 9, 10A and 10B are diagrams for explaining the operating principle of the present invention according to one aspect thereof.

As shown in FIG. 9, an optical disk 60 according to the present invention includes a head guide track 61, a writable region 62, and a preformed track 63. The guide track 62 is made up of a single spiral track or concentric tracks, and has a constant depth or height. The writable region 62 is formed between two mutually adjacent head guide tracks 61. The preformed track 63 is formed within the head guide track 61, and is made up of intermittent pits which have a depth different from that of the head guide track 61 or intermittent projections which have a height different from that of the head guide track 61. ROM (read-only) information exclusively for reading is written in advance on the preformed track 63.

The depth of the intermittent pits or the height of the intermittent projections forming the preformed track 63 is set so that the amplitude of a tracking error signal from the head guide track 61 and the amplitude of a tracking error signal from the preformed track 63 become approximately the same.

On the other hand, an optical disk unit according to the present invention includes a write means 141, an objective lens 142, a tracking error signal generating means 143, a selecting means 144, a tracking control means 145, and a read means 146 which are connected as shown in FIG. 9.

The write means 141 writes information in the writable region 62 of the optical disk 60 by a light beam which has the light intensity thereof modulated by the information. This light beam is emitted from a light source provided in the write means 141. A reflected light beam from the optical disk 60, which is obtained by irradiating a light beam on the optical disk 60 via the objective lens 142, is supplied to the tracking error signal generating means 143 which generates a tracking error signal based on this reflected light beam. The selecting means 144 selects the polarity of the tracking error signal to have the same or inverted phase. The tracking control means 145 drives the objective lens 142 based on the tracking error signal from the selecting means 144, so as to displace the spot of the light beam on the optical disk in a direction along the width of the track, that is, the radial direction of the optical disk 60. The read means 146 reads the information written in the writable region 62 or the ROM information written in the preformed track 63 based on the reflected light beam.

When carrying out a tracking control using the head guide track 61, the light beam which is converged on the writable region 62 is reflected, and the resulting reflected light beam includes the diffracted lights from the head guide tracks 61 on both sides of the writable region 62. Hence, the tracking error signal generating means 143 generates the tracking error signal which corresponds to the difference between the two diffracted lights, and this tracking error signal is used to drive the objective lens 162 via the selecting means 144 and the tracking control means 145 and to displace the position of the spot of the light beam on the optical disk 60 so that the intensities of the two diffracted lights become the same. As a result, it is possible to position the spot of the light beam at a center of the writable region 62.

A maximum difference between the intensities of the two diffracted lights occurs when the spot of the light beam falls wide from the writable region 62 by a maximum amount. This maximum difference differs depending on the constant depth of the head guide track 61 if the head guide track 61 is a continuous groove. In the case of a continuous groove having a rectangular cross section, the difference between the intensities of the two diffracted lights becomes a maximum when the depth of this continuous groove is $\lambda/8n$, where $\lambda$ denotes the wavelength of the light beam and n denotes the refractive index of a substrate material forming the optical disk 60. The difference between the intensities of the two diffracted lights becomes smaller than the maximum if the depth of the continuous groove is shallower or deeper than $\lambda/8n$.

On the other hand, when carrying out the tracking control using the preformed track 63 which has the ROM information prerecorded in the form of intermittent pits or projections, the maximum difference between the diffracted lights from the preformed tracks 63 on both sides of the writable region 62 decreases as the intervals of the pits or projections increases, regardless of whether or not the depth of the pits of the height of the projections is constant. In addition, there is a depth of the pits or a height of the projections at which the intensities of the two diffracted lights become the same, even if the intervals of the pits of projections differ to a certain extent.

According to the optical disk 60, if the head guide track 61 is formed by a groove, the depth of this groove is set shallower or deeper than $\lambda/8n$. In addition, the preformed track 63 is formed within the head guide track 61 in the form of intermittent pits, and the depth of the intermittent pits is made deeper or shallower than $\lambda/8n$. Alternatively, the preformed track 63 is formed within the head guide track 61 in the form of intermittent projections, and the height of the intermittent projections is made lower or higher than $\lambda/8n$. As a result, it is possible to maintain the amplitudes of the tracking error signals from the head guide track 61 and the preformed track 63 the same, regardless of the intervals of the intermittent pits or projections forming the preformed track 63.

The selecting means 144 selects the polarity of the tracking error signal when reading the optical disk 60 in the optical disk unit, so as to select the tracking position to within the writable region 62 or the head guide track 61 and the preformed track 63.

Next, a description will be given of the manner in which the tracking position changes depending on the selection of the polarity of the tracking error signal made in the selecting means 144, by referring to FIGS. 10A and 10B.

FIG. 10B shows a cross section of a part of the optical disk 60 along the radial direction thereof. As shown, a land 65 and a pit of groove 66 are alternately arranged. The land 65 corresponds to the writable region 62, and the pit or groove 66 corresponds to the head guide track 61 or the preformed track 63.

FIG. 10A shows the tracking error signal before the tracking control is carried out as a light beam 67 traverses the optical disk 60 in the direction of an arrow 68. The tracking control means 145 moves the objective lens 142 to the right in FIG. 10B if the polarity of the tracking error signal shown in FIG. 10A is negative. On the other hand, the tracking control means 145 moves the objective lens 142 to the left in FIG. 10B if the polarity of the tracking error signal shown in FIG. 10A is positive.

Accordingly, when obtaining the tracking error signal shown in FIG. 10A with the same phase by the selecting means 144, the spot of the light beam which is converged by the objective lens 142 and formed on the optical disk 60 tracks the land 65. On the other hand, when obtaining the tracking error signal shown in FIG. 10A with the inverted phase by the selecting means 144, the spot of the light beam tracks the pit or groove 66. Therefore, it is possible to select either the write or read operation with respect to the writable region 62 (land 65) or, the read operation with respect to the ROM information which is written on the preformed track 63 (pit or groove 66).

Next, a description will be given of a first embodiment of an optical disk according to the present invention, by referring to FIGS. 11A and 11B.

Figure 11A:
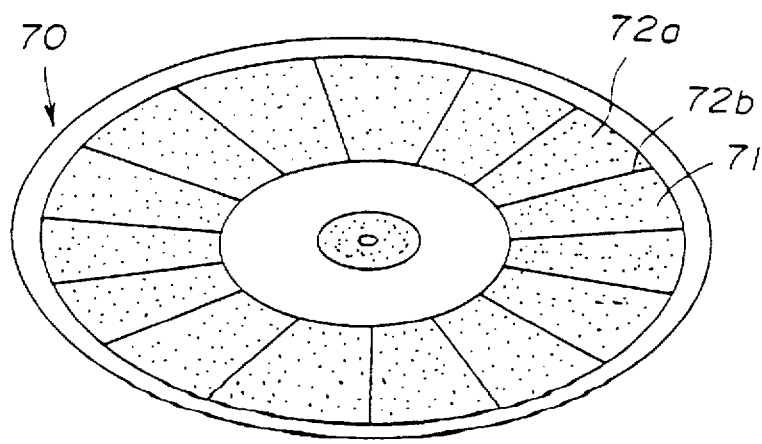
FIGS. 11A and 11B respectively are perspective views showing a first embodiment of an optical disk according to the present invention.
Figure 11B:
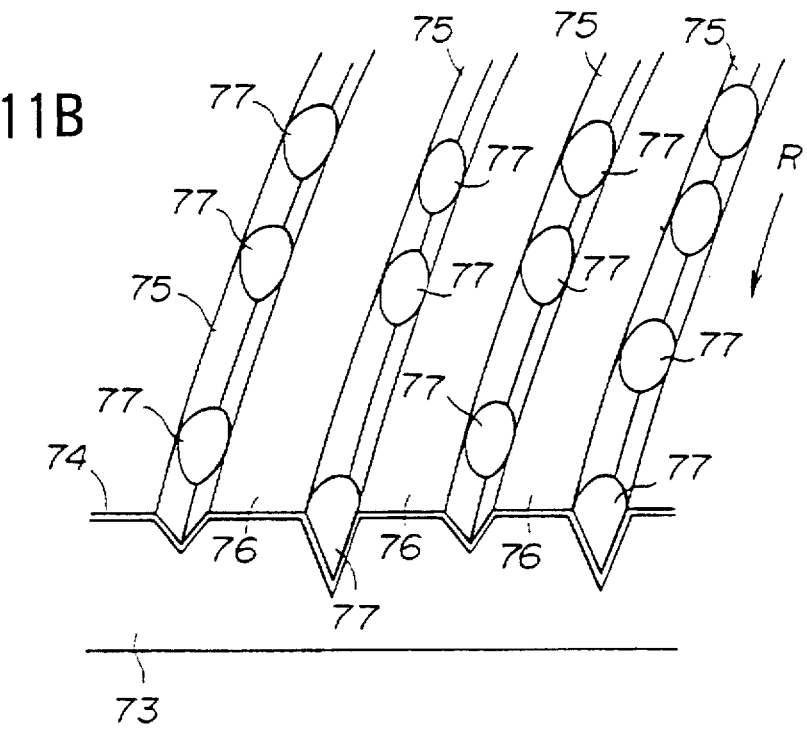

FIG. 11A shows a perspective view of an optical disk 70, and FIG. 11B shows an important part of the optical disk 70 on an enlarged scale. ROM information is written in a write surface 71 of the optical disk 70. In addition, a region 72a with respect to which arbitrary information is written to and read from and a preformat region 72b are periodically arranged on the optical disk 70.

As shown in FIG. 11B, the region 72a includes a continuous groove 75 which has a constant depth and a V-shaped cross section, for example. This continuous groove 75 forms the head guide track 61 described above which is made up of a single continuous track or concentric tracks such that track turns of the continuous groove 75 are arranged at a constant track pitch. The region 72a also includes a land 76 between two mutually adjacent continuous grooves 75. This land 76 forms the writable region 62 described above.

In addition, ROM information is preformed within the continuous groove 75 in the form of intermittent pits 77 having a predetermined depth different from that of the continuous groove 75. The pits 77 are preformed during the production stage of the optical disk 70. The intermittent pits 77 form the preformed track 63 described above.

The continuous groove 75, the land 76 and the pits 77 are respectively formed on a substrate 73 via a recording layer 74 which is made of a magneto-optic material. In the land 76 of the preformat region 72b shown in FIG. 11A, the ID signal which includes the sector number and the track number is written in advance not in the form of intermittent pits but as the change in the direction of magnetization according to the magneto-optic recording.

Figure 12:
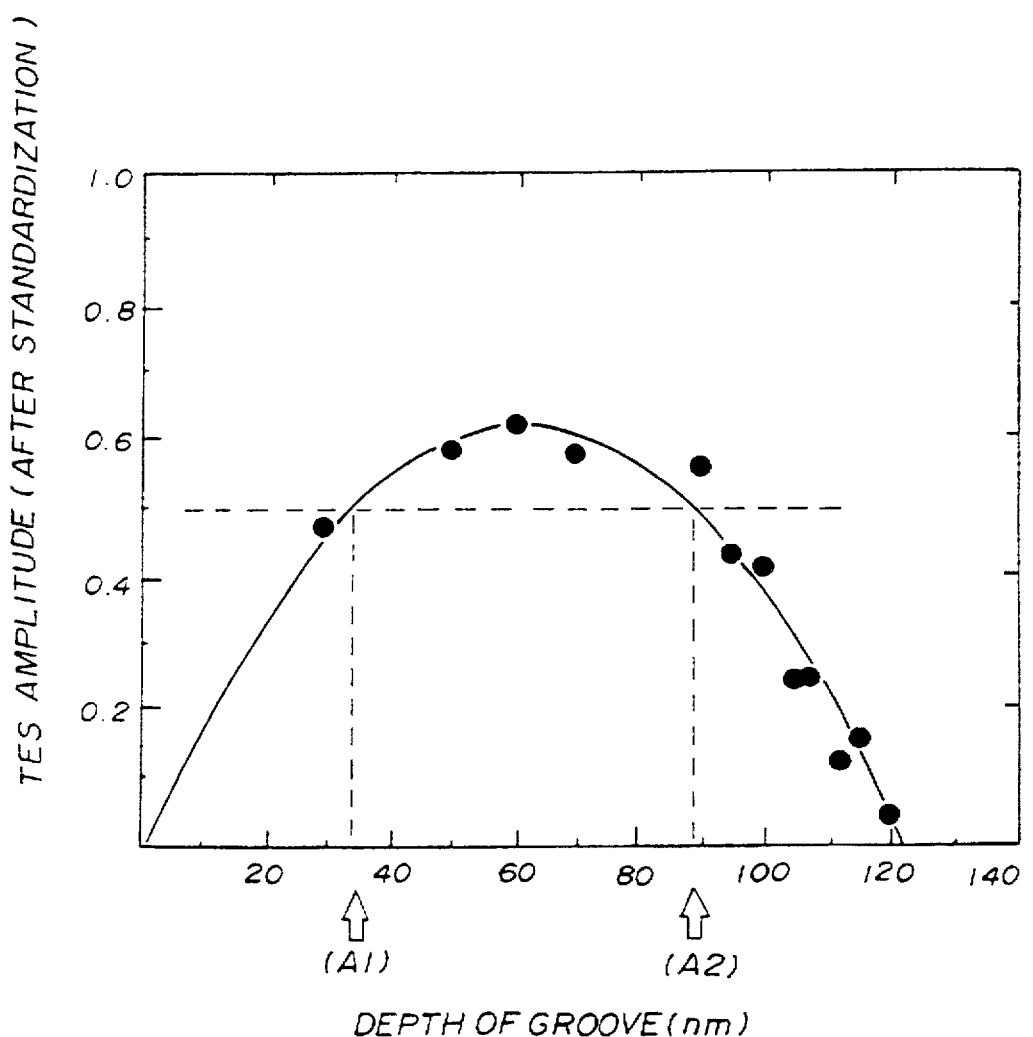
FIG. 12 is a diagram showing a groove depth versus tracking error signal amplitude characteristic of the first embodiment of the optical disk.
Figure 13:
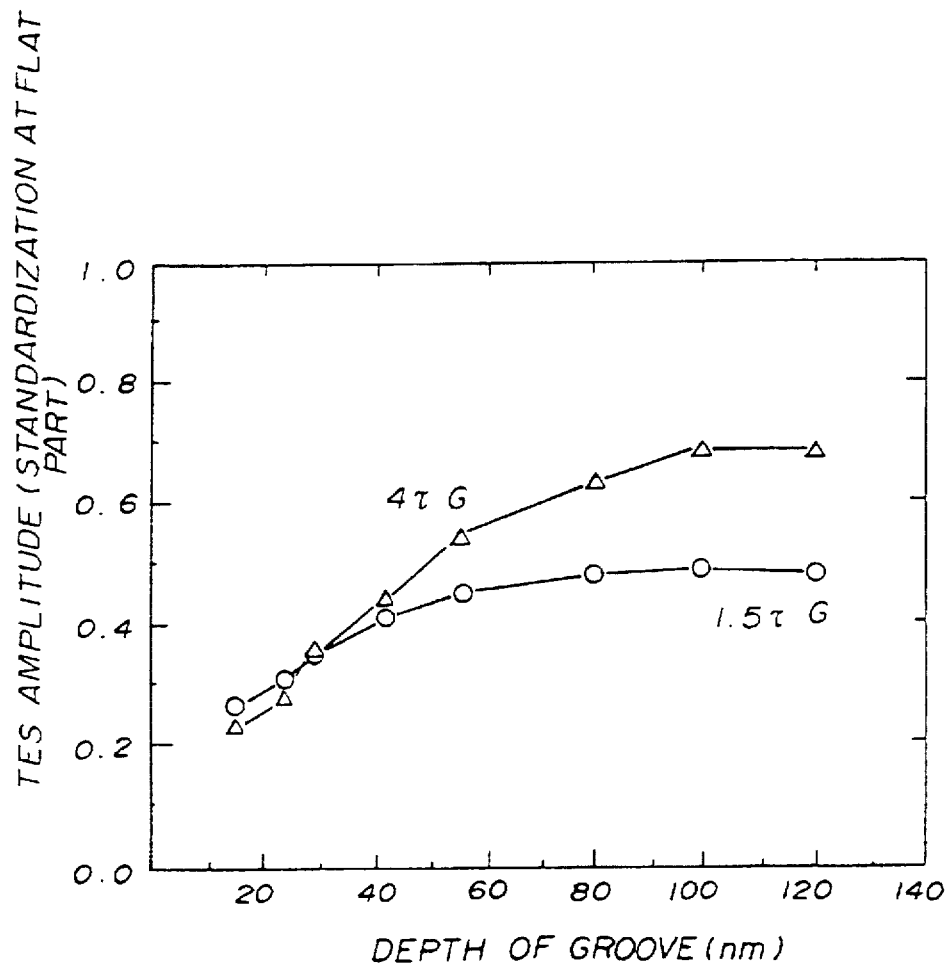
FIG. 13 is a diagram showing a groove depth versus tracking error signal amplitude characteristic of the first embodiment of the optical disk for a case where the groove has pits.

Next, a description will be given of the depths of the continuous groove 75 and the pits 77. FIG. 12 shows the tracking error signal amplitude for different depths of the continuous groove 75 having the V-shaped cross section. In FIGS. 12 and FIG. 13 which will be described later, TES is an abbreviation for the tracking error signal. As may be seen from FIG. 12, the tracking error signal amplitude becomes a maximum when the depth of the continuous groove 75 is 60 nm, and the tracking error signal amplitude decreases as the depth of the continuous groove 75 becomes shallower or deeper than 60 nm.

Accordingly, the tracking error signal amplitude is the same at a point (A1) where the depth of the continuous groove 75 is approximately 33 nm and a point (A2) where the depth of the continuous groove 75 is approximately 90 nm. This means that, if the pit 77 has the depth at the point (A2) and connects to the continuous groove 75 which has the depth at the point (A1), tracking error signals having the same amplitude are obtained from the pit 77 and the continuous groove 75. Hence, even if the intervals of the pits 77 change at random depending on the ROM information, the tracking error signal amplitude will not change. Similar effects can of course be obtained if the pit 77 has the depth at the point (A1) and connects to the continuous groove 75 which has the depth at the point (A2).

The characteristics shown in FIG. 12 slightly changes depending on the widths of the continuous groove 75 and the pit 77 or, the cross sectional shapes of the continuous groove 75 and the pit 77. However, in each case, the tracking error signal amplitude has a maximum at a certain depth of the groove or pit. For this reason, it is possible to take measures so that the tracking error signal amplitude will not change.

FIG. 13 shows the tracking error signal amplitude for different depths of the continuous groove 75 which has a V-shaped cross section with an opening width of 0.7 μm and connects to the pit 77 which has a U-shaped cross section with a width of 0.9 μm and a depth of 170 nm. As may be seen from FIG. 13, the tracking error signal amplitude becomes greater as the depth of the continuous groove 75 becomes deeper from approximately 20 nm towards 120 μm. In addition, between a minimum pit interval 1.5ζ and a maximum pit interval 4ζ of the signal which is obtained by (2, 7) modulation, the tracking error signal amplitude increases more with the maximum pit interval 4ζ of the pits 77. But although the tracking error signal amplitude increases more with the maximum pit interval 4ζ, the tracking error signal amplitudes match for both the minimum and maximum pit intervals 1.5ζ and 4ζ at the depth of approximately 30 nm.

Accordingly, by using the pit 77 which has the U-shaped cross section with a width of 0.9 μm and a depth of 170 nm and the continuous groove 75 which has the V-shaped cross section with an opening width of 0.7 μm and a depth of 30 μm, it is possible to obtain tracking error signals having essentially no amplitude deviation regardless of the information (that is, intervals) of the pits 77.

Figure 14:
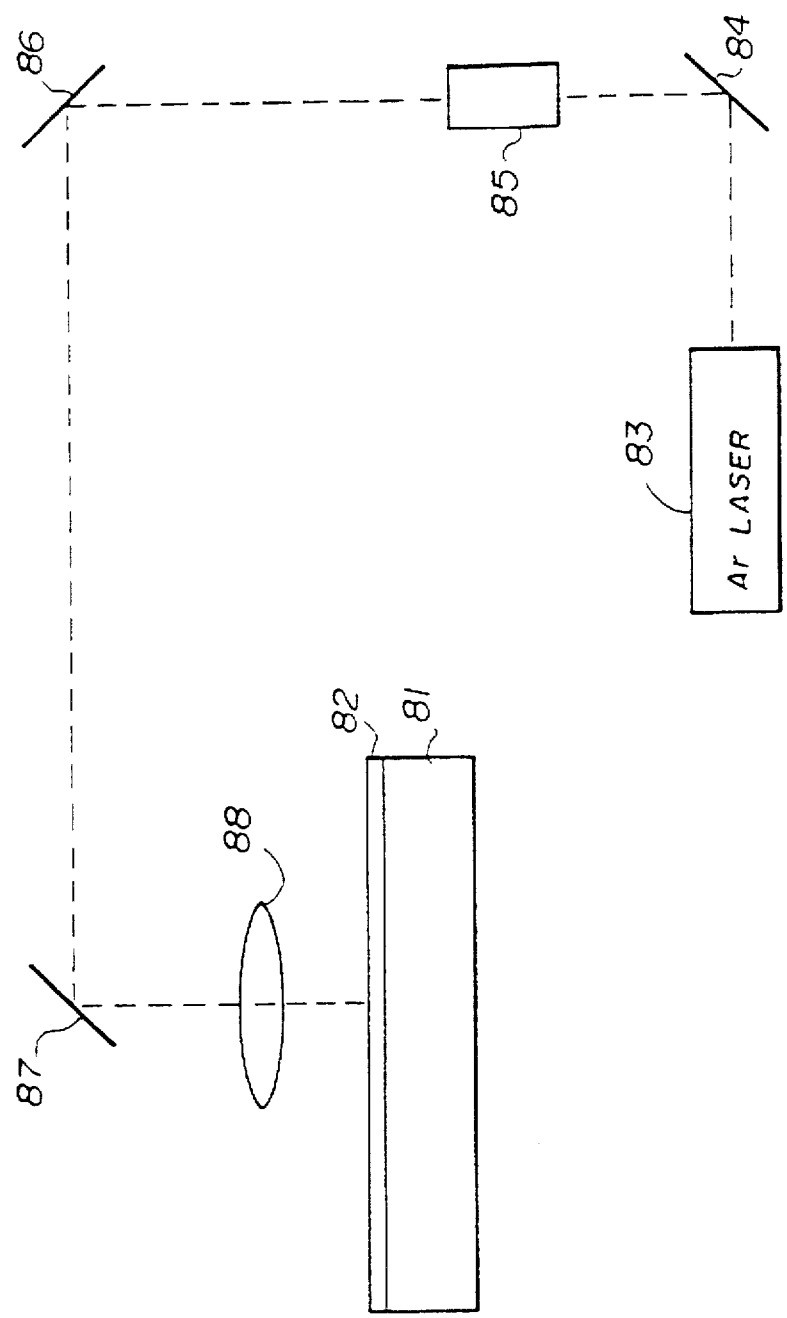
FIG. 14 is a system block diagram showing an exposure apparatus which is used in a first embodiment of an optical disk producing method according to the present invention.

Next, a description will be given of a first embodiment of an optical disk producing method according to the present invention. FIG. 14 shows an exposure apparatus which is used in this first embodiment of the optical disk producing method. In FIG. 14, a photoresist 82 is formed on the surface of a circular glass plate 81, and thereafter, a solvent remaining within the photoresist 82 is evaporated by a prebaking process.

Then, a laser beam having a constant light intensity is emitted from an Ar laser source 83. This laser beam is reflected by a mirror 84 and is input to a light modulator 85. The light modulator 85 modulates the light intensity of the laser beam to levels respectively corresponding to the depth of the continuous groove 75 and the depth of the pit 77. In addition, a modulated output of the light modulator 85 is reflected by mirrors 86 and 87 and is irradiated via a lens 88 onto the photoresist 82 of the circular glass plate 81 which rotates. As a result, the continuous groove 75 and the pit 77 are recorded on the photoresist 82 in the form of latent images.

Figure 15D:
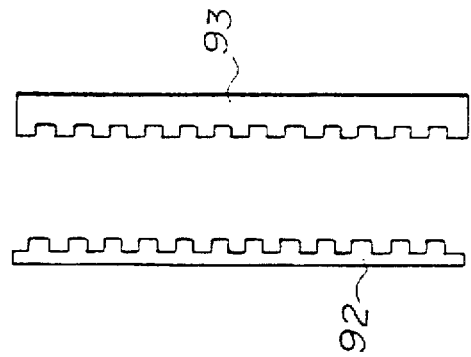
FIGS. 15A, 15B, 15C and 15D respectively are cross sectional views for explaining the steps of the first embodiment of the optical disk producing method.
Figure 15A:
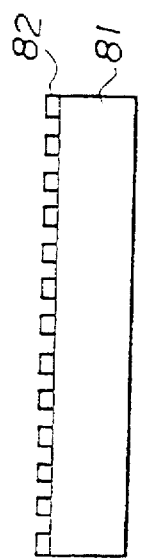
Figure 15B:
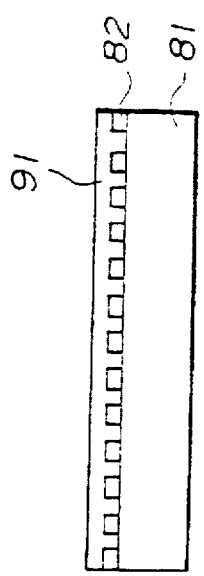

Next, the photoresist 82 is developed to form a concavo-convex pattern of the continuous groove 75 and the pit 77 on the photoresist 82, as shown in FIG. 15A. Thereafter, a Ni thin film is deposited as an electrode by vacuum evaporation, and a Ni plated layer 91 is formed on the photoresist 82 by a Ni plating, as shown in FIG. 15B.

Figure 15C:
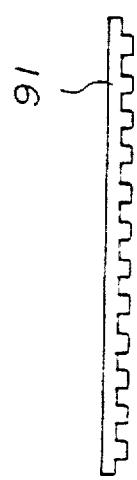

This Ni plated layer 91 is removed from the photoresist 82 by a known method so as to obtain a Ni stamper shown in FIG. 15C. The Ni plated layer 91, that is, the Ni stamper, is mounted on a die of an injection molding machine for the optical disk. For example, a polycarbonate substrate material is injection molded by the die, and a molded substrate 93 shown in FIG. 15D is formed. This molded substrate 93 has a concavo-convex pattern corresponding to that of the Ni stamper. The optical disk 70 is formed by successively sputtering a protection layer made of Tb-SiO$_2$, for example, a magneto-optic recording material such as TbFeCo, for example, and a protection layer.

In FIGS. 15A through 15D, each production step is basically the same as that of the existing magneto-optic disk producing method.

Therefore, the optical disk 70 which is produced includes a continuous groove 75 which has a V-shaped cross section, a depth of approximately 40 nm and a width of approximately 0.4 μm and forms the head guide track, and a pit 77 which has a V-shaped cross section, a depth of approximately 80 nm and a width of approximately 0.4 μm and forms the preformed track. The present inventors have confirmed through experiments tat the tracking error signal amplitude which is obtained from this optical disk 70 is approximately constant regardless of the intervals of the pits 77 at approximately 50% of the intensity of the reflection at the flat part.

In FIGS. 15A through 15D, if a plating process is added immediately prior to the step shown in FIG. 15D, it is possible to obtain a substrate having a reversed concavo-convex pattern. In addition, after the optical disk 70 is produced according to the steps shown in FIGS. 15A through 15D, the ID signal including the sector number, the track number and the like is written on the land 76 for every predetermined period according to the normal magneto-optic recording, so as to form the preformat region 72b.

Next, a description will be given of a second embodiment of the optical disk according to the present invention, by referring to FIGS. 16A and 16B.

Figure 16A:
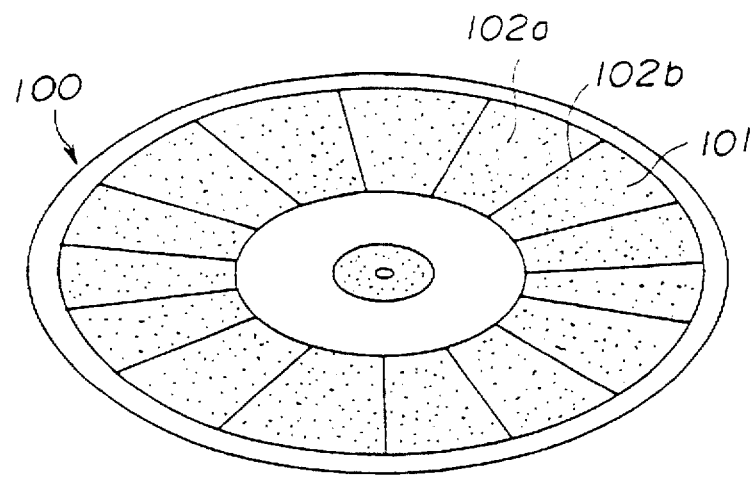
FIGS. 16A and 16B respectively are perspective views showing a second embodiment of the optical disk according to the present invention.
Figure 16B:
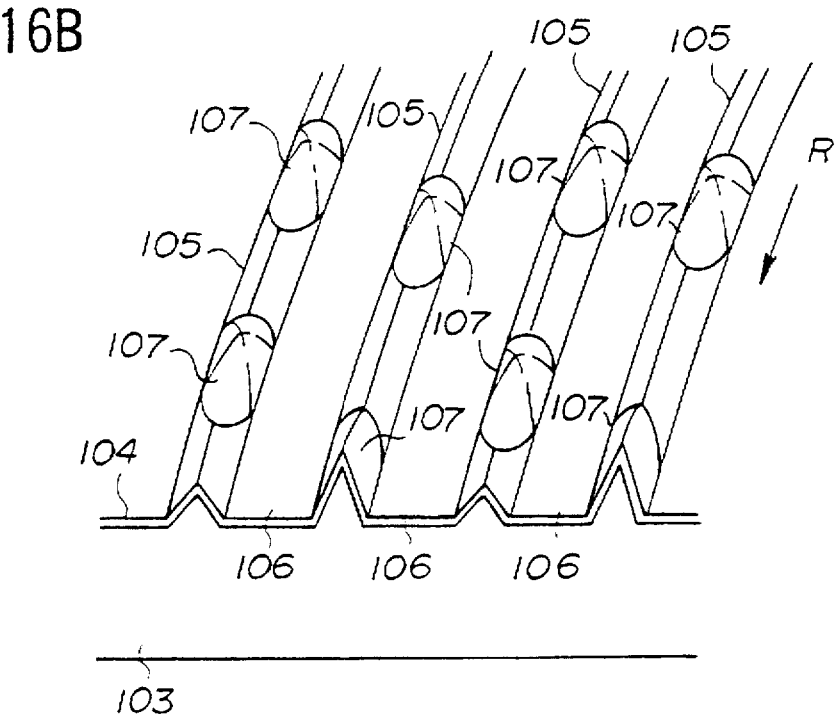

FIG. 16A shows a perspective view of an optical disk 100, and FIG. 16B shows an important part of the optical disk 100 on an enlarged scale. The optical disk 100 is similar to the optical disk 70 in that ROM information is written on a write surface 101, and that a region 102a with respect to which arbitrary information is written to and read from and a preformat region 102b are periodically arranged on the optical disk 100. However, the concavo-convex pattern of the optical disk 100 is reversed compared to that of the optical disk 70.

In other words, as shown on an enlarged scale in FIG. 16B, a continuous rail 105 having a V-shaped cross section and a constant height is continuously formed on the region 102a. This continuous rail 105 forms the head guide track 61 which is made up of a single spiral track or concentric tracks such that track turns of the continuous rail 105 are arranged at a constant pitch. In addition, a land 106 is formed between two continuous rails 105 which are mutually adjacent in the radial direction of the optical disk 100. This land 106 forms the writable region 62.

In addition, ROM information is preformed within the continuous rail 105 in the form of intermittent projections 107 having a predetermined height different from that of the continuous rail 105. The projections 107 are preformed during the production stage of the optical disk 100. The intermittent projections 107 form the preformed track 63 described above.

The continuous rail 105, the land 106 and the projections 107 are respectively formed on a substrate 103 via a recording layer 104 which is made of a magneto-optic material. The heights of the continuous rail 105 and the projection 107 are set so that the resulting tracking error signal amplitudes become the same. In addition, the optical disk 100 is produced similarly to the optical disk 70.

Figure 1A:
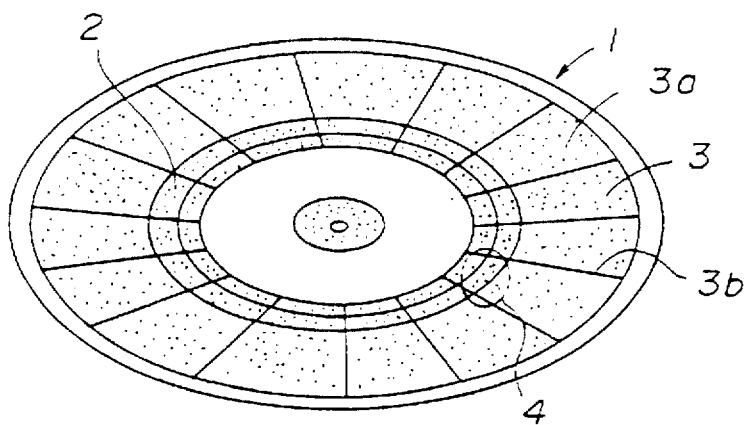
FIGS. 1A and 1B respectively are perspective views showing an example of a conventional optical disk.
Figure 1B:
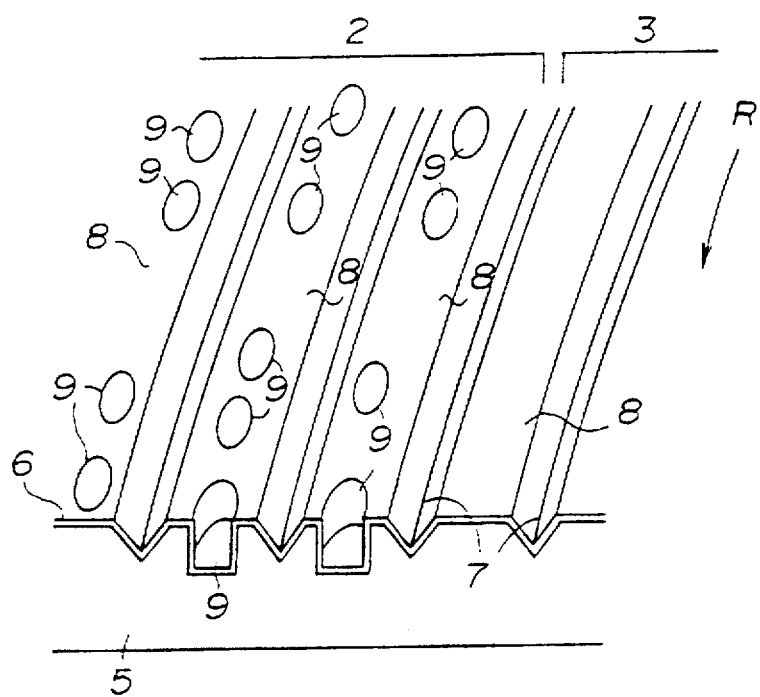

Similarly to the optical disk 70 and unlike the conventional optical disk 1 shown in FIGS. 1A and 1B which has the ROM information preformed in the ROM region 2 in the form of intermittent pits 9, the ROM information of the optical disk 100 is preformed in the head guide track. For this reason, it is possible to increase the writable region of the optical disk 100 by the amount corresponding to the ROM region 2 of the conventional optical disk 1. Furthermore, unlike the conventional optical disk 10 shown in FIGS. 2A and 2B, the amplitude of the tracking error signal obtained from the optical disk 100 does not change, and it is therefore possible to carry out stable and accurate tracking control.

Figure 17:
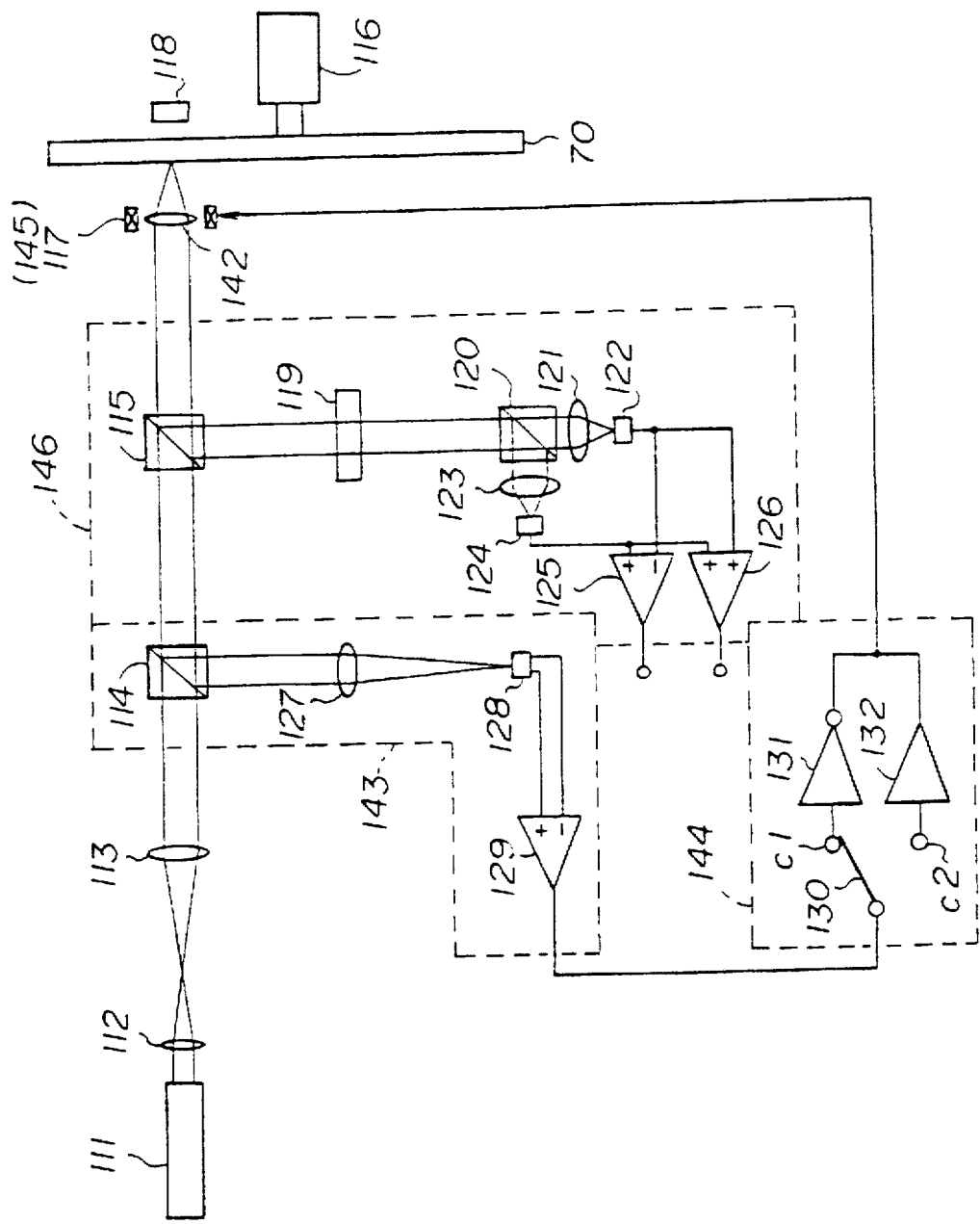
FIG. 17 is a system block diagram showing a first embodiment of an optical disk unit according to the present invention.

Next, a description will be given of a first embodiment of an optical disk unit according to the present invention, by referring to FIG. 17. In FIG. 17, those parts which are the same as those corresponding parts in FIG. 9 are designated by the same reference numerals, and a description thereof will be omitted. In FIG. 17, the illustration of a focus servo circuit is omitted for the sake of convenience.

In FIG. 17, a part of the optical disk unit excluding a spindle motor 116, a magnet 118 and the optical disk 70 forms an optical head. This optical head is moved in a radial direction of the optical disk 70. However, the illustration and description of a mechanism for moving the optical head, a demodulating circuit provided at a stage subsequent to a differential amplifier 125 and an adding amplifier 126, a recording circuit which controls a driving current of a semiconductor laser 111 and the like are omitted because such elements are known.

The light beam emitted from the semiconductor laser 111 in FIG. 17 is formed into parallel light via lenses 112 and 113, and is successively transmitted through polarization beam splitters 114 and 115 before reaching an objective lens 142.

The objective lens 142 converges the incident light beam so that the light beam irradiates the recording layer 74 via a back surface of the substrate 73 of the optical disk 70 in focus, thereby forming a light spot. The optical disk 70 is rotated by the spindle motor 116. The position of the objective lens 142 is controlled in response to a tracking error signal which is supplied to a driving mechanism 117, so as to change the position of the light spot on the optical disk 70.

When carrying out a write operation, the light intensity of the light beam emitted from the semiconductor laser 111 is modulated depending on the information which is to be written. During a time in which the light intensity of the laser beam is large, the medium temperature at a local part of the writable region of the optical disk 70 which is irradiated by the light spot rises above the Curie temperature, and the magnetization reversal occurs in the recording layer 74 depending on the external magnetic field which is applied on the optical disk 70 from the magnet 118. On the other hand, during a time in which the light intensity of the laser beam is small, the medium temperature at the local part of the writable region irradiated by the light spot does not rise over the Curie temperature, and thus, no magnetization reversal occurs. As a result, the information which is to be written is written on the recording layer 74 in the writable region of the optical disk 70 as a change in the direction of magnetization.

On the other hand, when carrying out an erase operation, the part of the optical disk 70 which is to be erased is irradiated by the light spot with a large constant laser power so that the light intensity of the light beam is the same as the large light intensity used at the time of the write operation. Hence, the medium temperature of the part of the optical disk 70 irradiated by the light spot rises over the Curie temperature. In addition, the external magnetic field which is applied to the optical disk 70 by the magnet 118 is applied in a direction which is reversed from that at the time of the write operation, so that the direction of magnetization is reversed to that at the time of the write operation.

Furthermore, when carrying out a read operation, the semiconductor laser 111 emits a light beam of a small constant laser power so that the magnetization reversal will not occur. The reflected light beam which is obtained from the optical disk 70 in this case is transmitted through the objective lens 142 and is supplied to the polarization beam splitter 115 where a portion of the reflected light beam is reflected. On the other hand, the remaining portion of the reflected light beam is transmitted through the polarization beam splitter 115 and is reflected by the polarization beam splitter 114.

The reflected light from the writable region of the optical disk 70 (corresponding to the writable region 62 shown in FIG. 9) has the polarization plane with different rotation direction depending on the written magnetization direction due to the magnetic Kerr effect. On the other hand, the reflected light from the preformed track of the optical disk 70 (corresponding to the preformed track 63 in FIG. 9) has a quantity of light which changes depending on the diffraction caused by the concavo-convex pattern on the optical disk 70.

Hence, the reflected light which is reflected by the polarization beam splitter 115 is supplied to a ½ wavelength plate 119 wherein the polarization plane is rotated, so that the P-polarization component is input to a polarization beam splitter 120 parallel to the incident plane. The P-polarization component of the incident reflected light is transmitted through the polarization beam splitter 120 and is input to a photodetector 122 via a focusing lens 121. In addition, the polarization beam splitter 120 reflects the S-polarization component of the incident reflected beam, and inputs the S-polarization component to a photodetector 124 via a focusing lens 123.

Electrical signals which are output from the photodetectors 122 and 124 by the photoelectric conversion have mutually inverted phases because these electrical signals respectively correspond to the components which are transmitted and reflected in the polarization beam splitter 120. Hence, when the output electrical signals of the photodetectors 122 and 124 are supplied to the differential amplifier 125 and differentially amplified, it is possible to obtain a magneto-optic signal having a level which corresponds to the rotation direction of the polarization plane of the reflected light from the writable region of the optical disk 70 (corresponding to the writable region 62 shown in FIG. 9).

On the other hand, when the output electrical signals of the photodetectors 122 and 124 are supplied to the adding amplifier 126 where the signals are added and amplified, it is possible to obtain a read signal having a level depending on the change in the quantity of reflected light, that is, a read signal which is read from the preformed track of the optical disk 70 (corresponding to the preformed track 63 in FIG. 9).

It is possible to use either the output signal of the differential amplifier 125 or the adding amplifier 126 as the signal which is supplied to a demodulating circuit (not shown) which is provided at a subsequent stage for the purpose of obtaining a final read signal. The signal to be supplied to the demodulating circuit can be determined depending on which one of the writable region and the preformed track the light spot is to scan under the control of a tracking servo circuit.

In this embodiment, this tracking servo circuit includes the tracking error signal generating means 143, the selecting means 144 and the tracking control means 145. The tracking error signal generating means 143 reflects the reflected light from the optical disk 70 by the polarization beam splitter 114, and supplies this reflected light to a s-split photodetector 128 via a focusing lens 127 so as to convert the reflected light into electrical signals. A differential amplifier 129 differentially amplifies the output electrical signals of the 2-split photodetector 128 and generates the tracking error signal. In other words, the tracking error signal which is obtained from the differential amplifier 129 has a level which is dependent on the difference between the light intensities of the diffracted lights from the track parts on both sides of the light spot on the optical disk 70.

The tracking error signal is selectively input to one of an inverting amplifier 131 and a non-inverting amplifier 132 via a switch 130. This switch 130, the inverting amplifier 131 and the non-inverting amplifier 132 form the selecting means 144. When the switch 130 is connected to a contact c1, the phase of the tracking error signal is inverted before supplying the same to the driving mechanism 117. On the other hand, when the switch 130 is connected to a contact c2, the phase of the tracking error signal is unchanged and supplied as it is to the driving mechanism 117.

Accordingly, if the optical disk unit is constructed so that the light spot follows and scans the land 76 of the optical disk 70, that is, the writable region, in response to the output tracking error signal of the inverting amplifier 131, it is possible to obtain from the differential amplifier 125 the read signal which is related to the information written in the writable region of the optical disk 70 when the switch 130 is connected to the contact c1.

On the other hand, when the switch 130 is connected to the contact c2 in this case, the tracking of the light spot is controlled so as to follow and scan the head guide track and the preformed track, as described above in conjunction with FIG. 10. Hence, in this latter case, it is possible to obtain from the adding amplifier 126 the read signal which is related to the ROM information written in the preformed track of the optical disk 70.

Of course, the tracking of the light spot on the optical disk 100 is carried out similarly to the above, but the read signals will have a relationship opposite to that described above for the optical disk 70.

In addition, the method of writing information in the writable region of the optical disks 60, 70 and 100 is not limited to the magneto-optic recording, and other recording methods such as a method which records holes and a method which uses the phase variation may be employed. But when employing such recording methods which use the change in the reflectance, the prerecorded information must be read by the same reading method as the ROM information. Hence, it becomes necessary in this case to separate the track of the writable region and the preformed track so as to prevent crosstalk between the signals read from the writable region and the preformed track.

Of course, the cross sectional shapes of the groove, pit and rail are not limited to those described above, and other cross sectional shapes such as a trapezoidal shape may be used.

Next, a description will be given of a third embodiment of the optical disk according to the present invention, by referring to FIGS. 18A and 18B.

FIG. 18A shows a plan view of an optical disk 231, and FIG. 18B shows a perspective view of an important part of the optical disk 231 encircled in FIG. 18A on an enlarged scale.

The optical disk 231 includes a first track and a second track. The first track is formed by a ROM pit sequence 233 which is made up of a plurality of ROM information pits 232. This first track is made up of a single spiral track or concentric tracks, and track turns of this first track are provided at constant intervals in the radial direction of the optical disk 231. On the other hand, the second track is formed in a write region 235, and is made up of ID signal pits 234 which indicate the track number, the sector number and the like. The ID signal pits 234 are arranged at a distance of ¼ the interval between two mutually adjacent ROM pit sequences 233 along the radial direction of the optical disk 231, and are arranged parallel to the ROM pit sequences 233. The user can write arbitrary information in the write region 235.

In this embodiment, the interval of the ROM pit sequences 233, that is, a distance between center lines 236 of two mutually adjacent ROM pit sequences 233, is 1.6 μm.

On the other hand, the ID signal pits 234 are arranged at a distance which is 1/4 the interval of 1.6 μm from the center line 236 in the radial direction towards the center of the optical disk 231. In other words, the ID signal pits 234 are arranged on a path 237 which is parallel to the center line 236 and is a distance 0.4 μm from the center line 236 in the radial direction towards the center of the optical disk 231.

Although not shown in FIGS. 18A and 18B, a recording layer similar to that of the above described embodiments of the optical disk are provided on the entire top surface of the optical disk 231 under the ROM pit sequence 233, the ID signal pits 234 and the write region 235. In addition, this recording layer is made of a magneto-optic material such as a DyFeCo alloy.

Next, a description will be given of a second embodiment of the optical disk producing method according to the present invention, by referring to FIGS. 19A through 19E. In this embodiment, it is assumed for the sake of convenience that the optical disk 231 is produced.

First, in an exposure process, a photoresist 242 is coated on a circular glass substrate 241 in FIG. 19A, and the necessary patterns are drawn on the photoresist 242 by two laser beams 243a and 243b which are reduced to 1 μm or less. The necessary patterns are the patterns which are necessary to form the ROM information pits 232 of the ROM pit sequence 233 and the ID signal pits 234.

When drawing the necessary patterns, the laser beams 243a and 243b are output in the following manner. That is, a laser beam 243 which is emitted from an Ar laser tube 244 is reflected by a semitransparent mirror 245 on one hand and is transmitted towards a mirror 246 on the other. Hence, the transmitted laser beam is reflected by the mirror 246. As a result, a split laser beam 243a from the semitransparent mirror 245 is modulated in a modulator 247, and a split laser beam 243b1 from the mirror 246 is modulated in a modulator 248. The modulated beam from the modulator 247 is used to form the ROM information pits 232, and the modulated beam from the modulator 248 is used to form the ID signal pits 234.

The modulated beam from the modulator 247 is reflected by a semitransparent mirror 250 via an objective lens 249. On the other hand, the modulated beam from the modulator 247 is reflected by a mirror 252 via an objective lens 251, and is transmitted through the semitransparent mirror 250. The objective lens 249 makes an adjustment so that the optical path of the modulated beam from the modulator 247 after being reflected by the semitransparent mirror 250 deviates slightly from the optical path of the modulated beam which is output from the modulator 248 and is transmitted through the semitransparent mirror 250.

The modulated beams from the semitransparent mirror 250 are reflected by a mirror 253 and are irradiated on the photoresist 242 as the laser beams 243a and 243b via an objective lens 254. The objective lens 254 makes the necessary adjustment so that the spots of the laser beams 243a and 243b on the surface of the photoresist 242 becomes 1 μm or less in diameter. On the other hand, the adjustment made in the objective lens 249 at the preceding stage separates the center lines of the spots of the two laser beams 243a and 243b by a distance of 0.4 μm.

Next, in a developing process, a photoresist 242a which has the necessary patterns drawn thereon by the exposure process is developed in FIG. 19B.

Thereafter, in a plating process, a Ni plating is made on the developed photoresist layer 242a to form a Ni plated part 255 in FIG. 19C.

In a removal process, the Ni plated part 255 is removed from the photoresist 242a to obtain a stamper (Ni plated part) 255 in FIG. 19D.

Finally, in a molding process, the stamper 255 is mounted on an injection molding machine (not shown) after the stamper 255 is shaped to a desired shape, and a substrate 256 shown in FIG. 19E is formed by molding a polycarbonate substrate.

In addition, a recording layer made of a magneto-optic material, a protection layer and the like are sputtered on a pattern surface of the substrate 256, and the optical disk 231 shown in FIGS. 18A and 18B is produced.

The optical disk 231 which is produced in the above described manner was loaded into an optical disk tester (not shown). The present inventors irradiated a spot of a read laser beam on the ROM pit sequence 233 as indicated by an arrow 238 in FIG. 18B, and observed a read signal (intensity of reflected light) on an oscilloscope while carrying out a tracking control. According to this observation, it was possible to confirm the existence of the ID signal which is read from the periodically arranged ID signal pits 234 and is mixed in the ROM information which is read from the ROM information pits 233.

In addition, the present inventors irradiated a spot of a read laser beam on the write region 235 as indicated by an arrow 239 in FIG. 18B, and observed a read signal on the oscilloscope while carrying out a tracking control. In this case, it was possible to confirm that the ID signal periodically exists within a signal having a light intensity which is read from a flat part of the optical disk 231.

It was possible to obtain the ID signal because a part of the spot of the read laser beam hits the ID signal pit 234 regardless of whether the spot is on the ROM pit sequence (ROM region) 233 as indicated by the arrow 238 or on the write region 235 as indicated by an arrow 239.

In other words, the spot of the read laser beam always hits the ID signal pit 234 of the ROM pit sequence 233 or the ID signal pit 234 or the write region 235, because the ID signal pits 234 are arranged on the path 237 which is parallel to the center line 236 and is a predetermined distance from the center line 236 in the radial direction towards the center of the optical disk 231, where the predetermined distance is ¼ the distance separating the center lines 236 of two mutually adjacent ROM pit sequences 233.

Of course, the ID signal pits 234 may be provided on a path 237 which is parallel to the center line 236 and is the predetermined distance from the center line 236 in the radial direction towards the outer periphery of the optical disk 231.

According to the third embodiment of the optical disk, it is possible to improve the recording density of the information which is arbitrarily written by the user and the ROM information which is prerecorded on the optical disk, because the ROM pit sequence 233, the ID signal pits 234 and the write region 235 are respectively arranged in a spiral path or concentric paths on the optical disk 231. In addition, it is possible to quickly detect a target position on the optical disk 231 when carrying out a write, erase or read operation.

Next, a description will be given of a fourth embodiment of the optical disk according to the present invention, by referring to FIGS. 20A and 20B.

Figures 20A, 20B:
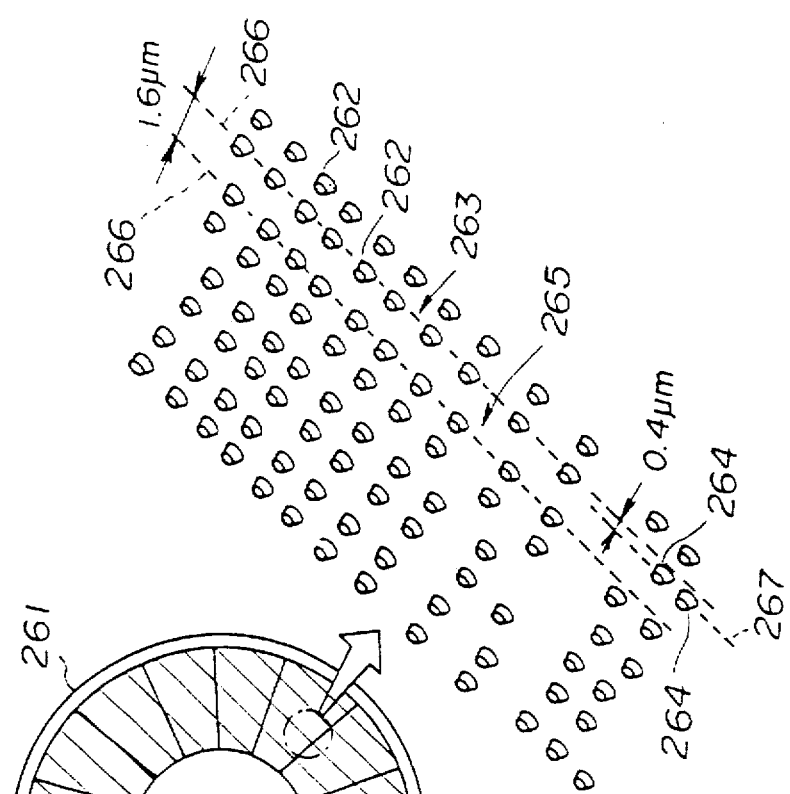
FIGS. 20A and 20B respectively are a plan view and a perspective view showing a fourth embodiment of the optical disk according to the present invention.

FIG. 20A shows a plan view of an optical disk 261, and FIG. 20B shows a perspective view of an important part of the optical disk 261 encircled in FIG. 20A on an enlarged scale.

The optical disk 261 shown in FIGS. 20A and 20B has projections in place of the pits of the optical disk 231 shown in FIGS. 18A and 18B. In other words, the optical disk 261 includes a first track and a second track. The first track is formed by a ROM projection sequence 263 which is made up of a plurality of ROM information projections 262. This first track is made up of a single spiral track or concentric tracks, and track turns of this first track are provided at constant intervals in the radial direction of the optical disk 261. On the other hand, the second track is formed in a write region 265, and is made up of ID signal projections 264 which indicate the track number, the sector number and the like. The ID signal projections 264 are arranged at a distance of ¼ the interval between two mutually adjacent ROM projection sequences 263 along the radial direction of the optical disk 261, and are arranged parallel to the ROM projection sequences 263. The user can write arbitrary information in the write region 265.

In this embodiment, the interval of the ROM projection sequences 263, that is, a distance between center lines 266 of two mutually adjacent ROM projection sequences 263, is 1.6 μm.

On the other hand, the ID signal projections 264 are arranged at a distance which is ¼ the interval of 1.6 μm from the center line 266 in the radial direction towards the center of the optical disk 261. In other words, the ID signal projections 264 are arranged on a path 267 which is parallel to the center line 266 and is a distance 0.4 μm from the center line 266 in the radial direction towards the center of the optical disk 261.

Although not shown in FIGS. 20A and 20B, a recording layer similar to that of the above described embodiments of the optical disk are provided on the entire top surface of the optical disk 261 under the ROM projection sequence 263, the ID signal projections 264 and the write region 265. In addition, this recording layer is made of a magneto-optic material such as a DyFeCo alloy.

Figure 21A:
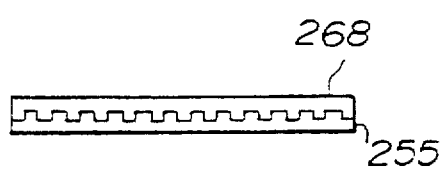
FIGS. 21A, 21B and 21C respectively are cross sectional views for explaining the steps of a third embodiment of the optical disk producing method according to the present invention.

Next, a description will be given of a third embodiment of the optical disk producing method according to the present invention, by referring to FIGS. 21A through 21C. In this embodiment, it is assumed for the sake of convenience that the optical disk 261 is produced.

The stamper 255 is formed by the steps described above in conjunction with FIGS. 19A through 19D. In a plating process, Ni is plated on the stamper 255 so as to form a Ni plated part 268 in FIG. 21A.

Figure 21B:
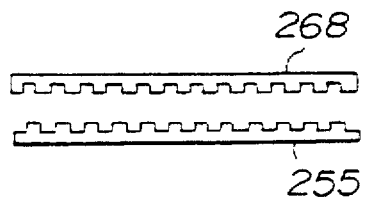

Then, in a removing process, the Ni plated part 268 is removed from the stamper 255 in FIG. 21B, so as to form a stamper 268 which has a concavo-convex pattern complementary to the concavo-convex pattern of the stamper 255.

Figure 21C:
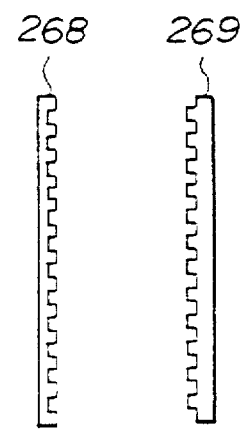

Finally, in a molding process, the stamper 268 is mounted on an injection molding machine (not shown) after the stamper 268 is shaped to a desired shape, and a substrate 269 shown in FIG. 21C is formed by molding a polycarbonate substrate which has a light transmitting characteristic. This substrate 269 has a concavo-convex pattern complementary to that of the substrate 256 shown in FIG. 19E.

In addition, a recording layer made of a magneto-optic material, a projection layer and the like are sputtered on a pattern surface of the substrate 269, and the optical disk 261 shown in FIGS. 20A and 20B is produced.

The optical disk 261 which is produced in the above described manner was loaded into an optical disk tester (not shown). The present inventors used a read laser beam which would track the write region 235 of the optical disk 231 shown in FIG. 18B. In this case, the irradiated read laser beam tracked the ROM projection sequence 263 in FIG. 20B, and a read signal (intensity of reflected light) was observed on an oscilloscope. According to this observation, it was possible to confirm the existence of the ID signal which is read from the periodically arranged ID signal projections 264 and is mixed in the ROM information which is read from the ROM information projections 263.

In addition, the present inventors used a read laser beam which would track the ROM pit region 233 of the optical disk 231 shown in FIG. 18B. In this case, the irradiated read laser beam tracked the write region 265 in FIG. 20B, and a read signal was observed on the oscilloscope. In this case, it was possible to confirm that the ID signal periodically exists within a signal having a light intensity which is read from a flat part of the optical disk 261.

The above described phenomenon occurred because the concavo-convex pattern of the optical disk 261 is complementary to that of the optical disk 231.

It was possible to obtain the ID signal because a part of the spot of the read laser beam hits the ID signal projection 264 regardless of whether the spot is on the ROM projection sequence (ROM region) 263 or on the write region 265.

In other words, the spot of the read laser beam always hits the ID signal projection 264 of the ROM projection sequence 263 or the ID signal projection 264 of the write region 265, because the ID signal projections 264 are arranged on the path 267 which is parallel to the center line 266 and is a predetermined distance from the center line 266 in the radial direction towards the center of the optical disk 261, where the predetermined distance is ¼ the distance separating the center lines 266 of two mutually adjacent ROM projection sequences 263.

According to the fourth embodiment of the optical disk, it is possible to improve the recording density of the information which is arbitrarily written by the user and the ROM information which is prerecorded on the optical disk, because the ROM projection sequence 263, the ID signal projections 264 and the write region 265 are respectively arranged in a spiral path or concentric paths on the optical disk 261. In addition, it is possible to quickly detect a target position on the optical disk 261 when carrying out a write, erase or read operation.

Figure 2A:
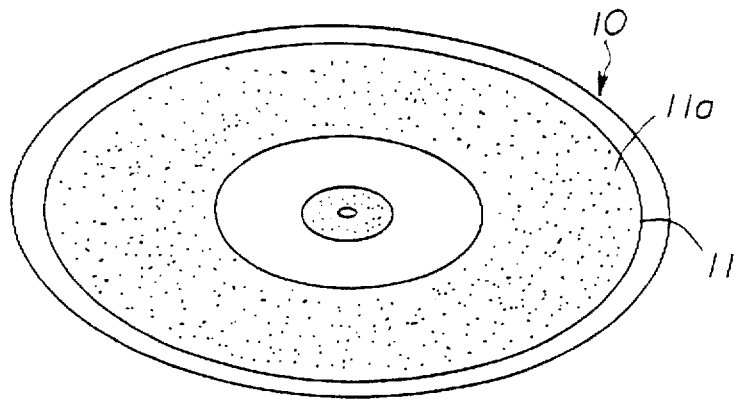
FIGS. 2A and 2B respectively are perspective views showing another example of the conventional optical disk.
Figure 2B:
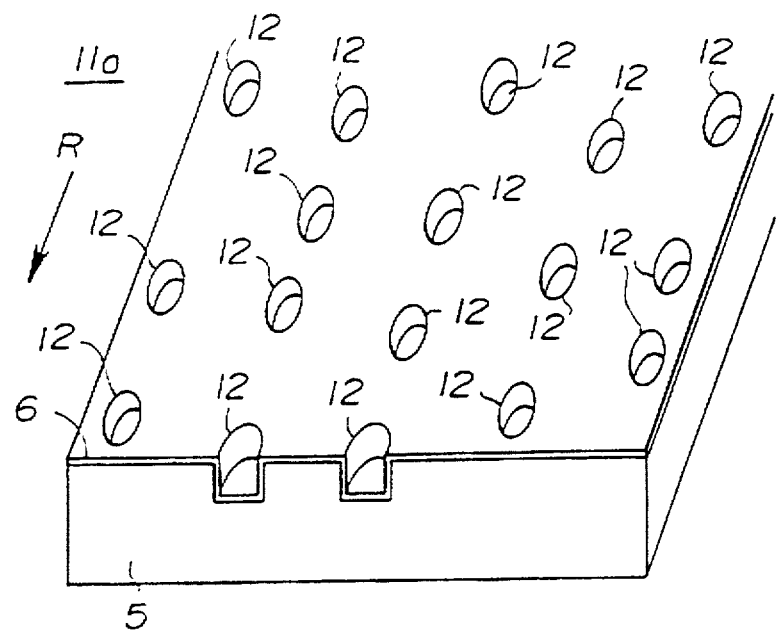
Figure 3:
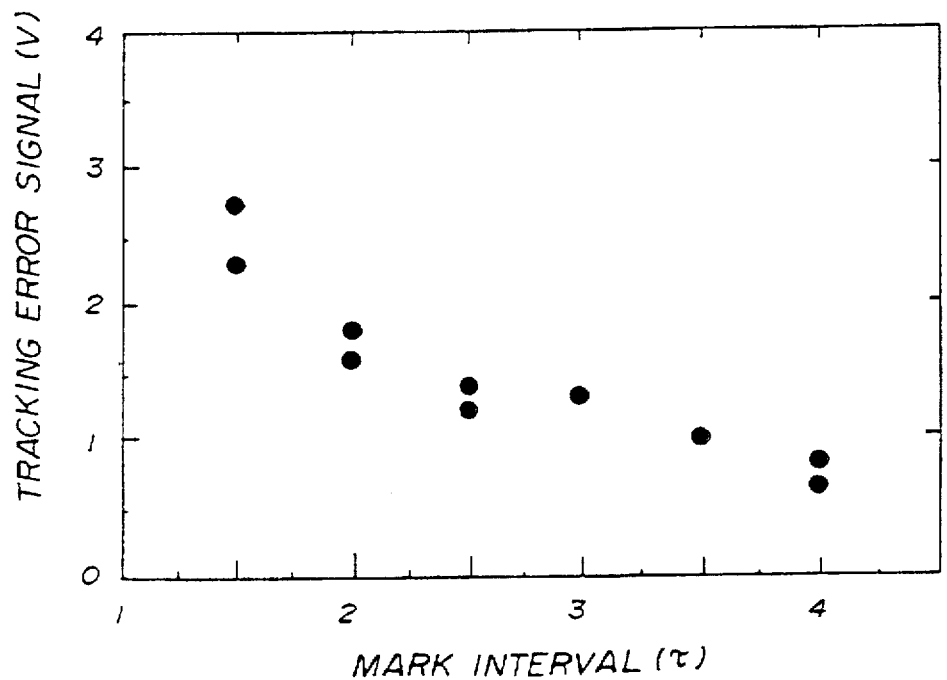
FIG. 3 is a diagram showing the relationship between a mark interval and an amplitude of a tracking error signal for the conventional optical disk shown in FIG. 2.
Figure 4:
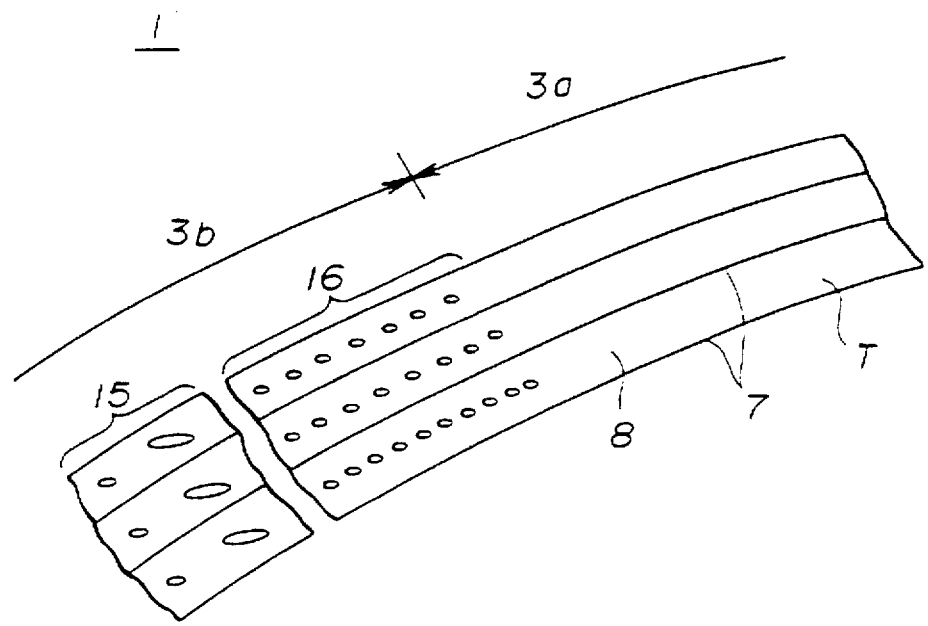
FIG. 4 is a perspective view showing a part of the conventional optical disk shown in FIG. 1 in a vicinity of a preformat region.
Figure 5:
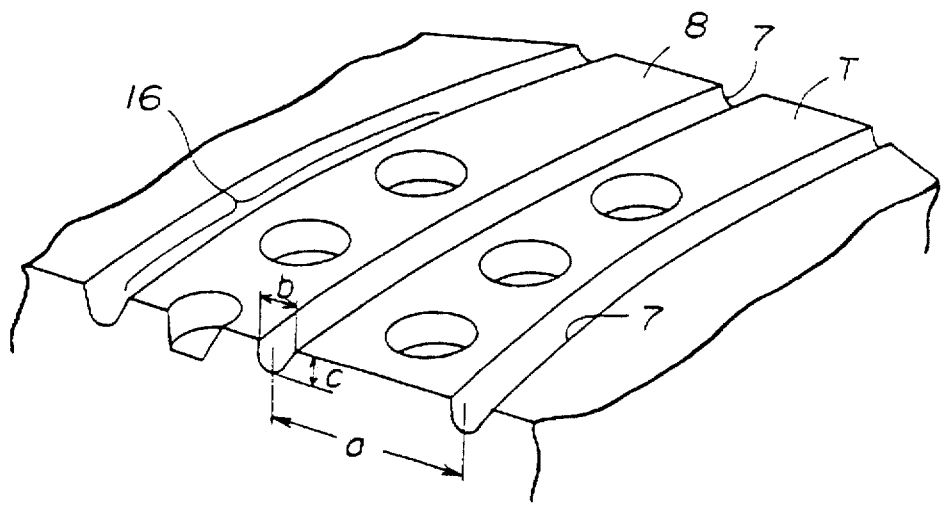
FIG. 5 is a perspective view showing an important part of the conventional optical disk shown in FIG. 4 on an enlarged scale.

According to the conventional optical disk 10 shown in FIGS. 2A and 2B in which the ROM pit sequence does not overlap the write region, the spot of the read beam will track the write region of the optical disk 10 if the optical disk 10 is loaded into a type of optical disk unit which reads the signal by tracking the land (write region) of the optical disk. In this case, there is a problem in that the ROM information of the ROM pit sequence cannot be read by this optical disk unit.

However, according to the optical disk 261 shown in FIGS. 20A and 20B, the spot of the read beam will correctly track the ROM projection sequence 263 even if the optical disk 261 is loaded into a type of optical disk unit which reads the signal by tracking the land of the optical disk. For this reason, it is possible to read the ROM information from the ROM information projections 262 of the optical disk 261.

In other words, as may be readily understood from the tracking mechanism described above in conjunction with FIGS. 10A and 10B, the polarity of the tracking error signal and the moving direction of the objective lens 142 may be reversed. Whether or not the tracking is made with respect to the pit (or groove) 66 which is closer to the objective lens 142 or the land 65 which is further away from the objective lens 142 in FIG. 10B, is determined by the polarity of the tracking error signal and the moving direction of the objective lens 142. Therefore, in order to make the beam spot track the pit sequence in the optical disk unit which tracks the land, the shape of the pits forming the pit sequence should be reversed, that is, the pits should be replaced by projections as in the case of the fourth embodiment of the optical disk.

Next, a description will be given of a fifth embodiment of the optical disk according to the present invention, by referring to FIGS. 22A and 22B.

Figures 22A, 22B:
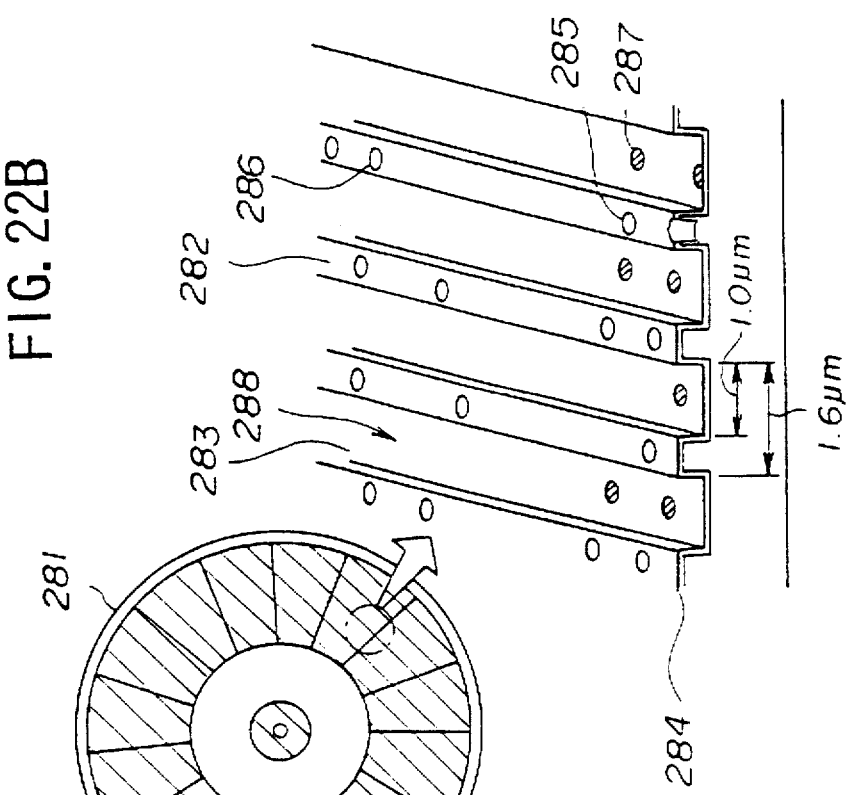
FIGS. 22A and 22B respectively are a plan view and a perspective view showing a fifth embodiment of the optical disk according to the present invention.

FIG. 22A shows a plan view of an optical disk 281, and FIG. 22B shows a perspective view of an important part of the optical disk 281 encircled in FIG. 22A on an enlarged scale.

The optical disk 281 shown in FIGS. 28A and 28B includes a land 282 which forms a first track, and a groove 283 which forms the second track. The land 282 and the groove 283 are alternately arranged in the radial direction of the optical disk 281. A recording layer 284 made of a magneto-optic material such as a DyFeCo alloys is formed on the entire surface of the land 282 and groove 283.

A distance between two lands 282 in the radial direction is 1.6 μm, and a width of the groove 283 which has a U-shaped cross section is approximately 1 μm. ID signal pits 285 are formed at parts where each land 282 approximately intersects lines which extend outwardly from the center of the optical disk 281 in the radial direction at 14.4° intervals. In addition, ROM information pits 286 are formed at parts of the land 282 other than the part where the ID signal pits 285 are formed.

The lines which extend radially at 14.4° intervals are imaginary lines corresponding to boundaries of the sectors of the optical disk 281. Generally, the optical disk is divided into 25 sectors, and the 14.40 interval is obtained when 360° is divided by 25.

A magneto-optic ID signal recording part 287 in which the ID signal is written by the magneto-optic recording is provided approximately at a part of the groove 283 adjacent to the ID signal pit 284 of the land 282. Parts of the groove 283 other than the magneto-optic ID signal recording part 287 forms a write region 288.

When irradiating the laser beam on the optical disk 281, the beam spot can only track one of the land 282 or the groove 283. For this reason, the magneto-optic ID signal recording part 287 is provided in the groove 283 so that the ID signal is readable from both the land 282 and the groove 283.

The optical disk 281 can be produced by slightly modifying the second embodiment of the optical disk producing method described above in conjunction with FIGS. 19A through 19E. In other words, when producing the optical disk 281, the two laser beams 243a and 243b are separated by a distance amounting to ½ the pitch of the lands 282, that is, ½ the interval between two lands 282 which are mutually adjacent in the radial direction of the optical disk 281. Hence in this case, the groove 283 is formed by the laser beam 243b, and the ID signal pits 285 and the ROM information pits 286 are formed by the laser beam 243a. Furthermore, the thickness of the photoresist 242 shown in FIGS. 19A through 19E and the power of the laser beam 243b which forms the groove 283 are optimized, so that the exposure is made to the glass substrate 241 and the cross section of the groove 283 is formed to the U-shape.

According to the optical disk 281, the ROM information and the ID signal are written in the land 282, and the ID signal is written in a small portion of the groove 283. Otherwise, the majority of the groove 283 can be used as in the write region 288. For this reason, it is possible to improve the recording density of the information which is arbitrarily written by the user and the ROM information which is written beforehand. In addition, it is possible to quickly detect a target position on the optical disk 281 when making a write, erase or read operation.

Moreover, when the optical disk 281 is loaded into a type of optical disk unit which reads the signal by tracking the land of the optical disk, it is possible to track the ROM information pits 286. Hence, it is possible to read the ROM information, and the problem encountered in the conventional optical disk 10 shown in FIGS. 2A and 2B is eliminated.

Next, a description will be given of a sixth embodiment of the optical disk according to the present invention, by referring to FIG. 23. In this embodiment, the present invention is applied to a magneto-optic disk.

Figure 23:
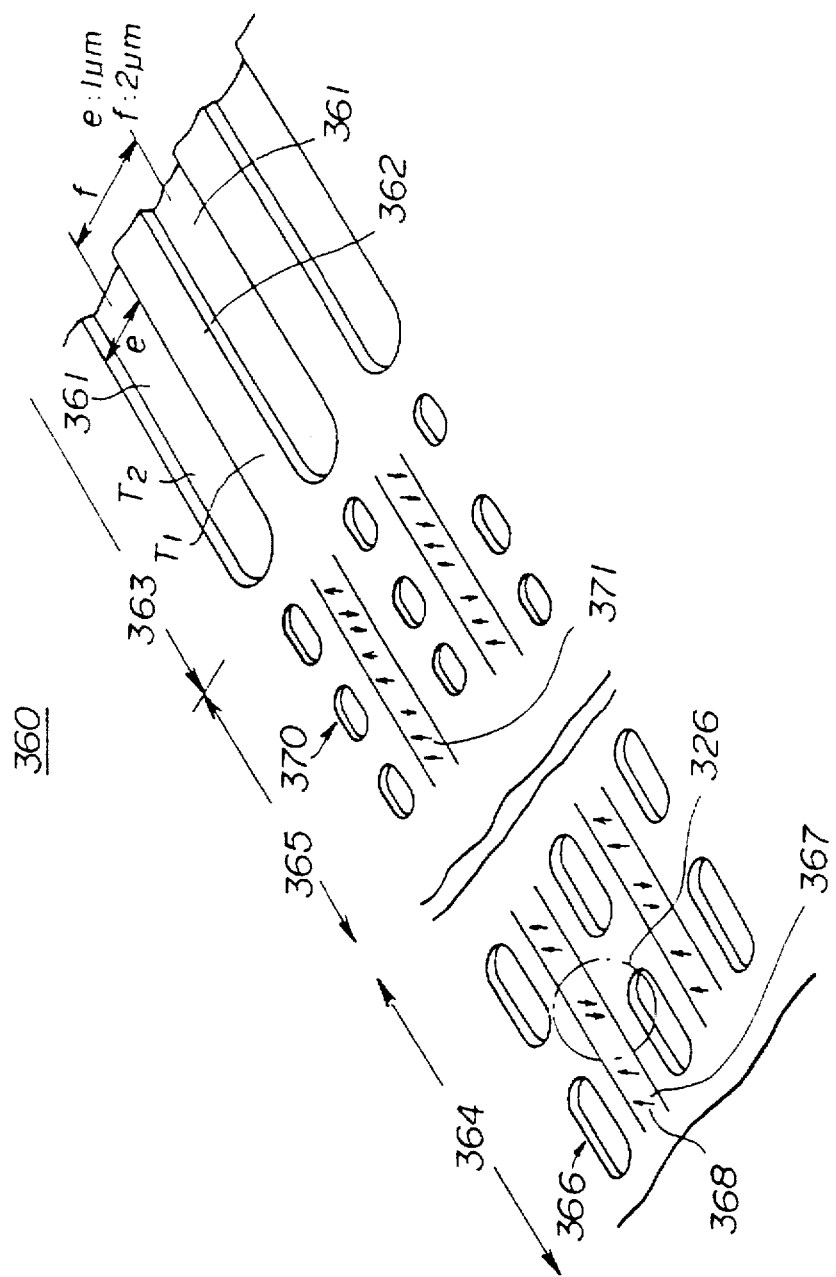
FIG. 23 is a perspective view showing an important part of a sixth embodiment of the optical disk according to the present invention.

A magneto-optic disk 360 shown in FIG. 23 includes a guide groove 361, and a land 362 which is provided between two mutually adjacent guide grooves 361. For example, the guide groove 361 has a width e=1 82 m, and an interval f between two mutually adjacent guide grooves 361 is 2 μm. The land 362 forms a track $T_1$, and the guide groove 361 forms a track $T_2$. A magnetic layer (not shown) which is magnetized in the perpendicular direction is formed on the entire top surface of the magneto-optic disk 360. The top surface of the magneto-optic disk 360 includes a data write region 363, an SM write region 364, and an ID write region 365.

In the SM write region 364, the SM is written on the track $T_2$ in the form of a pit sequence which is made up of SM pits 366. On the other hand, the SM is written by the magneto-optic recording on the track $T_1$ in the SM write region 364 in the form of a SM magneto-optical recording 367. In FIG. 23, an arrow 368 indicates the direction of perpendicular magnetization.

In the ID write region 365, the ID is written on the track $T_2$ in the form of a pit sequence which is made up of ID pits 370. On the other hand, the ID is written by the magneto-optic recording on the track $T_1$ in the ID write region 365 in the form of an ID magneto-optic recording 371.

The recording format of the magneto-optic disk 360 is shown in FIG. 30.

On the other hand, in the data write region 363, the data is written by the magneto-optic recording on each of the tracks $T_1$ and $T_2$.

Figure 24:
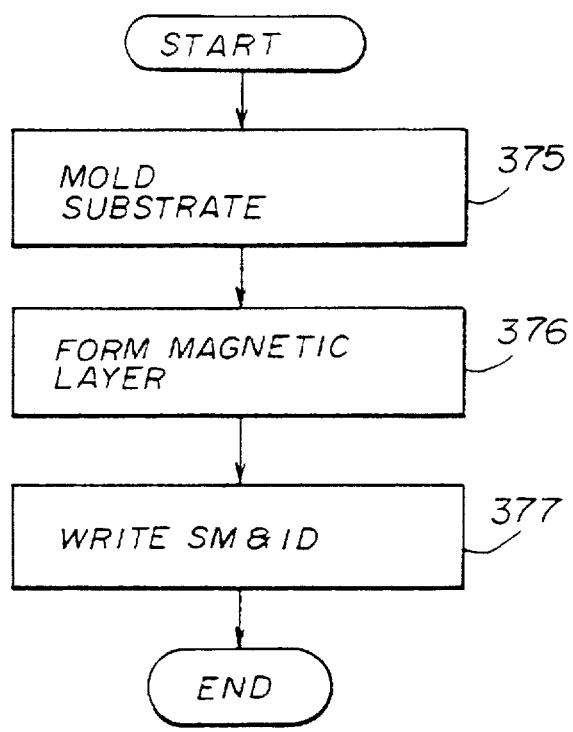
FIG. 24 is a flow chart for explaining a fourth embodiment of the optical disk producing method according to the present invention.

FIG. 24 is a flow chart for explaining a fourth embodiment of the optical disk producing method according to the present invention. In this embodiment of the optical disk producing method, it is assumed for the sake of convenience that the optical disk 360 shown in FIG. 23 is produced.

In FIG. 24, a step 375 carries out a substrate molding process. In other words, an injection molding is made by injecting a substrate material into a mold in which a stamper is fit, so that a substrate having guide grooves and pit sequences is formed.

Next, a step 376 carries out a magnetic layer forming process. In other words, a perpendicular magnetic layer is formed on at least the entire top surface of the substrate which is formed in the preceding step 375.

Thereafter, a step 377 carries out a write process. In other words, a semi-completed magnetooptic disk is loaded into a write unit so as to write the SM and ID. More particularly, the SM is written in the SM write region 364 of the track $T_1$ by the magneto-optic recording with reference to the preformed pit sequences, and the ID is then written in the ID write region 365 by the magneto-optic recording.

The magneto-optic disk 360 is completed by the above described steps 375 through 377.

Figure 25:
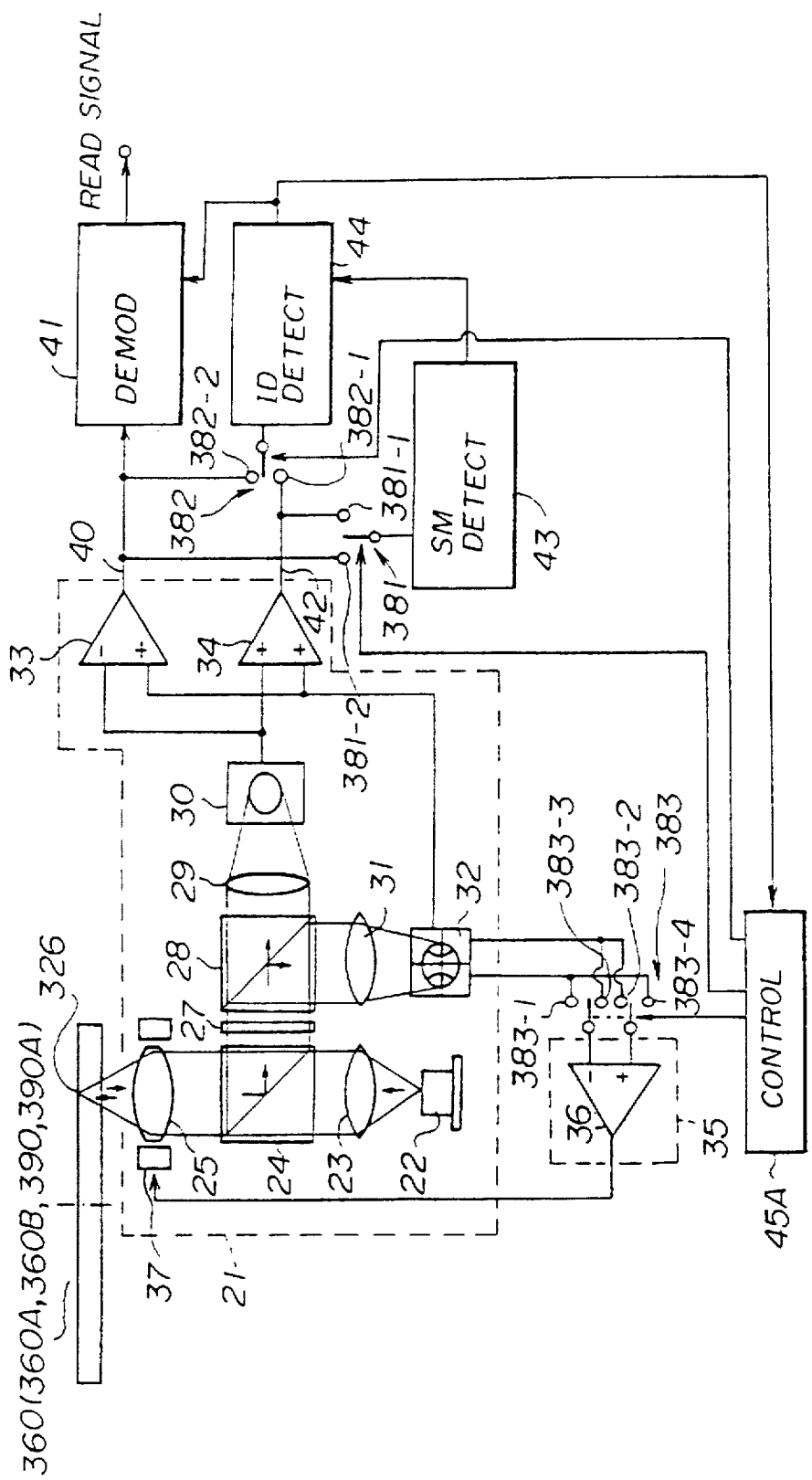
FIG. 25 is a system block diagram showing a second embodiment of the optical disk unit according to the present invention.

Next, a description will be given of a second embodiment of the optical disk unit according to the present invention, by referring to FIG. 25. In FIG. 25, those parts which are the same as those corresponding parts in FIG. 6 are designated by the same reference numerals, and a description thereof will be omitted.

Figure 6:
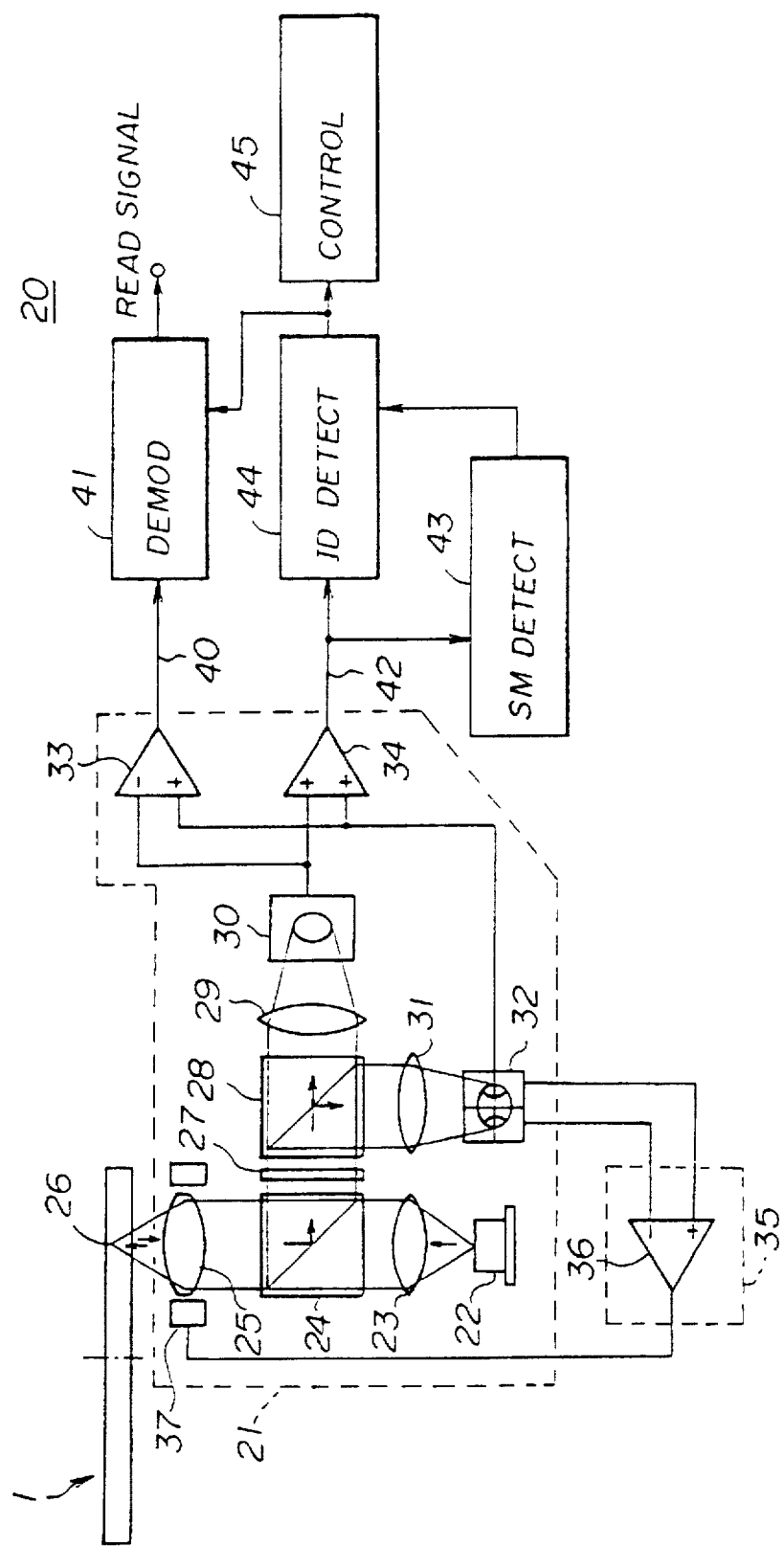
FIG. 6 is a system block diagram showing an example of a conventional optical disk unit which plays the conventional optical disk shown in FIG. 1.

An optical disk unit 380 includes three switches 381, 382 and 383 in addition to those elements of the optical disk unit 20 shown in FIG. 6. In addition, a controller 45A is provided in place of the controller 45 shown in FIG. 6. This controller 45A also controls the switches 381, 382 and 383.

The switch 381 is provided at the input stage of the SM detector 43. This switch 381 inputs the reflectance signal 42 to the SM detector 43 when connected to a contact 381-1, and inputs the magneto-optic signal 40 to the SM detector 43 when connected to a contact 381-2.

The switch 382 is provided at the input stage of the ID detector 44. This switch 382 inputs the reflectance signal 42 to the ID detector 44 when connected to a contact 382-1, and inputs the magneto-optic signal 40 to the ID detector 44 when connected to a contact 382-2.

The switch 383 is provided at the input stage of the tracking servo circuit 35, and is used to reverse the characteristic of the tracking servo circuit 35. This is because the relationship between the tracking error and the outputs of the split photodetector 32 when the spot scans the track $T_1$ of the land 362, is opposite to the relationship between the tracking error and the outputs of the split photodetector 32 when the spot scans the track $T_2$ of the guide groove 361.

Next, a description will be given of the read operation of the optical disk unit 380 when reading the magneto-optic disk 360.

First, a description will be given of a case where the beam spot 326 scans the track $T_1$ of the land 362 of the magneto-optic disk 360.

In this case, the switch 381 is connected to the contact 381-2, the switch 382 is connected to the contact 382-2 and the switch 383 is connected to the contacts 383-1 and 383-2, responsive to control signals output from the controller 45A.

When the beam spot 326 scans the SM write region 364, the magneto-optic signal 40 which is read from the SM magneto-optic recording 367 is input to the SM detector 43 via the switch 381 and the SM is detected. The content of the SM pits 366 on the adjacent track $T_2$ is the same as the content of the SM magneto-optic recording 367 on the track Tl. and the problem of crosstalk does not occur. The ID detector 44 is activated when the SM is detected by the SM detector 43.

On the other hand, when the beam spot 326 scans the ID write region 365, the magneto-optic signal 40 which is read from the ID magneto-optic recording 371 is input to the ID detector 44 via the switch 382 and the ID is detected.

Next, a description will be given of the crosstalk from the ID pits 370 of the adjacent track $T_2$. According to the measurements made by the present inventors, the crosstalk in this case was −33 dB as shown in FIG. 31. This crosstalk of −33 dB is smaller than a tolerable value which is −24 dB, and thus, the ID magneto-optic recording 371 can be read correctly without error.

The beam spot 362 then scans the data region 363. Hence, the magneto-optic signal 40 which is obtained by reading the data which is written on the track $T_1$ in the land 362 by the magneto-optic recording is demodulated by the demodulator 41, and the demodulator 41 outputs the read signal (data). The crosstalk from the adjacent track $T_2$ caused by the reading of the data which is similarly written on the adjacent track $T_2$ by the magneto-optic recording was also measured, but the crosstalk was −34 dB and small as shown in FIG. 31. Hence, no problem was introduced by this crosstalk.

Figure 7:
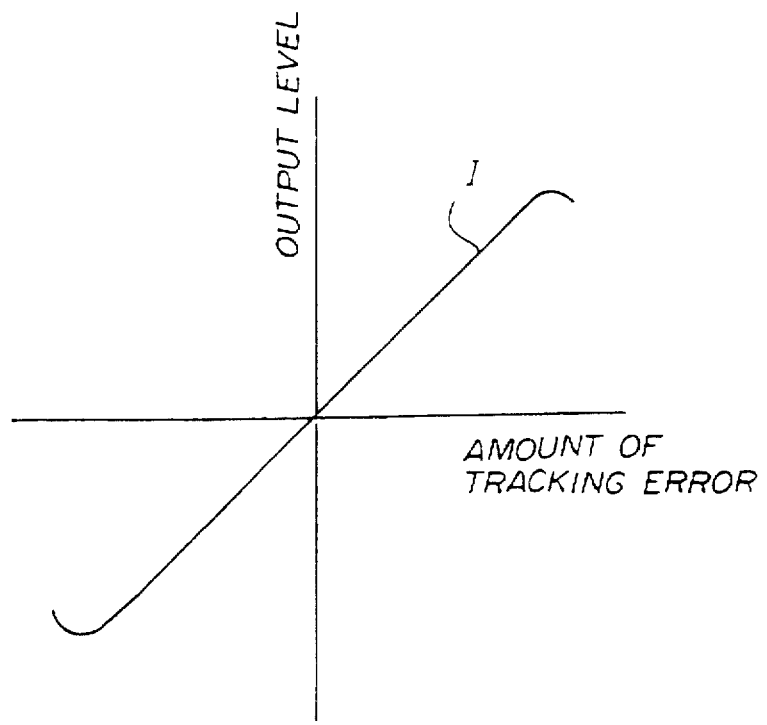
FIG. 7 is a diagram showing the relationship between the amount of tracking error and the output level of a tracking error signal.
Figure 8:
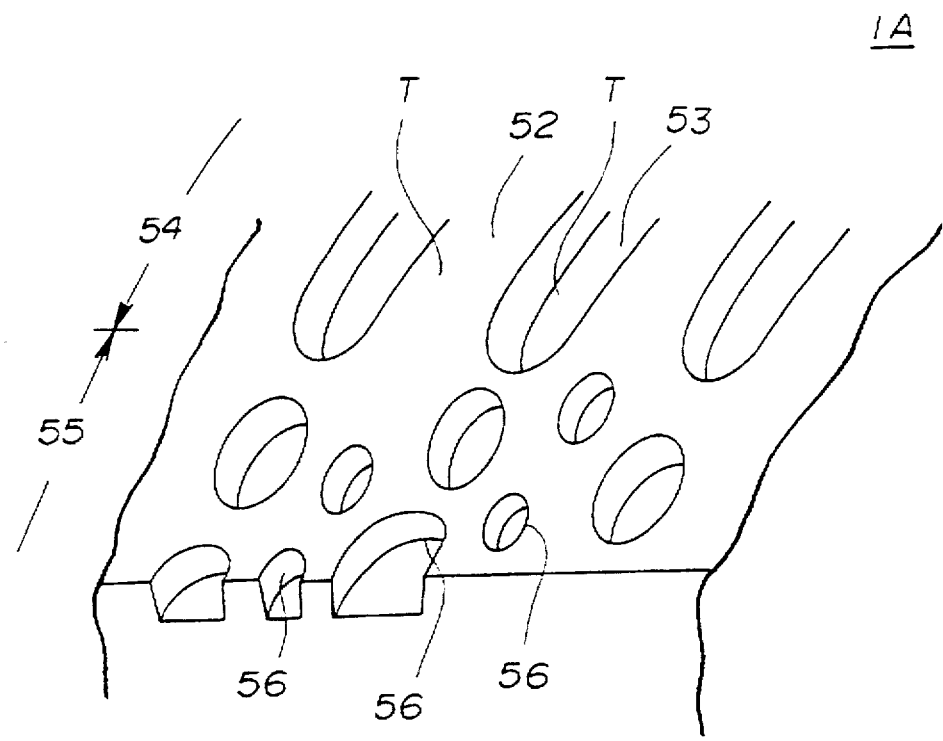
FIG. 8 is a perspective view showing an important part of a conceivable optical disk.

Of course, the tracking control is carried out in a normal manner according to the curve I shown in FIG. 7 described above.

Next, a description will be given of a case where the beam spot 326 scans the track $T_2$ of the guide groove 361 of the magneto-optic disk 360.

In this case, the switch 381 is connected to the contact 381-1, the switch 382 is connected to the contact 382-1, and the switch 383 is connected to the contacts 383-3 and 383-4, responsive to control signals output from the controller 45A.

When the beam spot 326 scans the SM write region 364, the reflectance signal 42 which is read from the SM pits 366 is input to the SM detector 43 via the switch 381 and the SM is detected. The crosstalk from the SM magneto-optic recording 367 of the adjacent track $T_1$ does not introduce any problems. The ID detector 44 is activated when the SM is detected by the SM detector 43.

On the other hand, when the beam spot 326 scans the ID write region 365, the reflectance signal 42 which is read from the ID pits 370 is input to the ID detector 44 via the switch 382 and the ID is detected.

Next, a description will be given of the crosstalk from the ID magneto-optic recording 371 of the adjacent track $T_1$. According to the measurements made by the present inventors, the crosstalk in this case was −40 dB as shown in FIG. 31. This crosstalk of −40 dB is smaller than the tolerable value which is −24 dB, and thus, the ID pits 370 can be read correctly without error.

The beam spot 362 then scans the data region 363. Hence, the magneto-optic signal 40 which is obtained by reading the data which is written on the track $T_2$ in the guide groove 361 by the magneto-optic recording is demodulated by the demodulator 41, and the demodulator 41 outputs the read signal (data). The crosstalk from the adjacent track $T_1$ caused by the reading of the data which is similarly written on the adjacent track $T_1$ by the magneto-optic recording was also measured, but the crosstalk was −34 dB and small as shown in FIG. 31. Hence, no problem was introduced by this crosstalk.

The relationship between the direction in which the beam spot 362 deviates and the output of the photodetector 32 when scanning the guide groove 361 is opposite to that when scanning the land 362. However, by providing the switch 383 with the contacts 383-1 through 383-4 connected as shown in FIG. 25, it becomes possible to carry out the tracking control in a normal manner according to the curve I shown in FIG. 7, regardless of whether the land 362 or the guide groove 361 is scanned.

Figure 26:
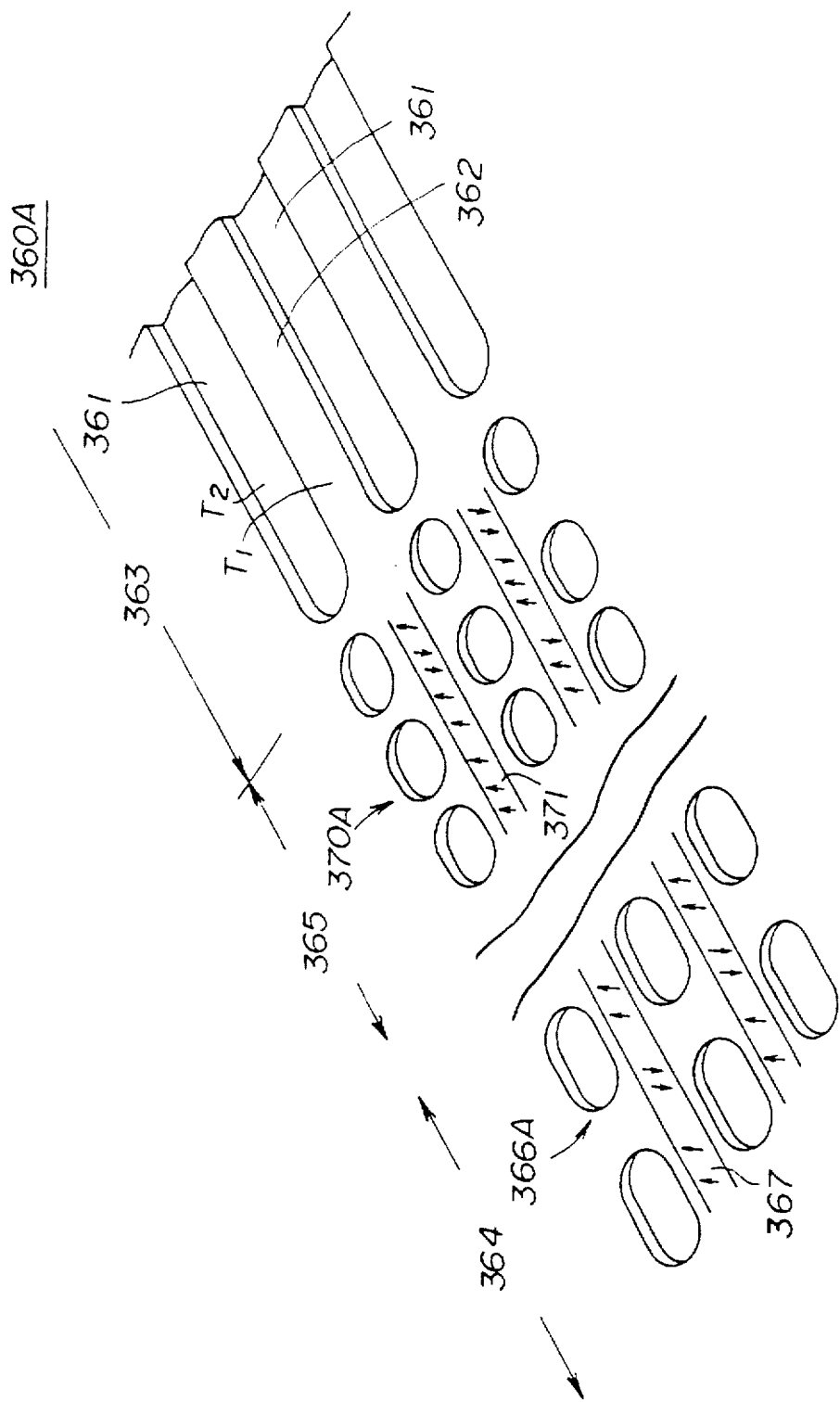
FIG. 26 is a perspective view showing an important part of a seventh embodiment of the optical disk according to the present invention.

Next, a description will be given of a seventh embodiment of the optical disk according to the present invention, by referring to FIG. 26. In FIG. 26, those parts which are the same as those corresponding parts in FIG. 23 are designated by the same reference numerals, and a description thereof will be omitted.

In a magneto-optic disk 360A shown in FIG. 26, the width of the sequence of SM pits 366A and the width of the sequence of ID pits 370A are made wider than those of FIG. 23, so as to have substantially the same width as the guide groove 361. The structure of this magneto-optic disk 360A is otherwise the same as that of the magneto-optic disk 360 shown in FIG. 23.

The recording format of the magneto-optic disk 360A is shown in FIG. 30.

On the other hand, the crosstalk of this magneto-optic disk 360A is shown in FIG. 31. With regard to the ID write region 365, the crosstalk from the ID pits 370A of the track $T_2$ was −29 dB, and the crosstalk from the ID magneto-optic recording 371 of the track $T_1$ was −41 dB as shown in FIG. 31. The crosstalk at the data write region 363 was −32 dB.

Figure 27:
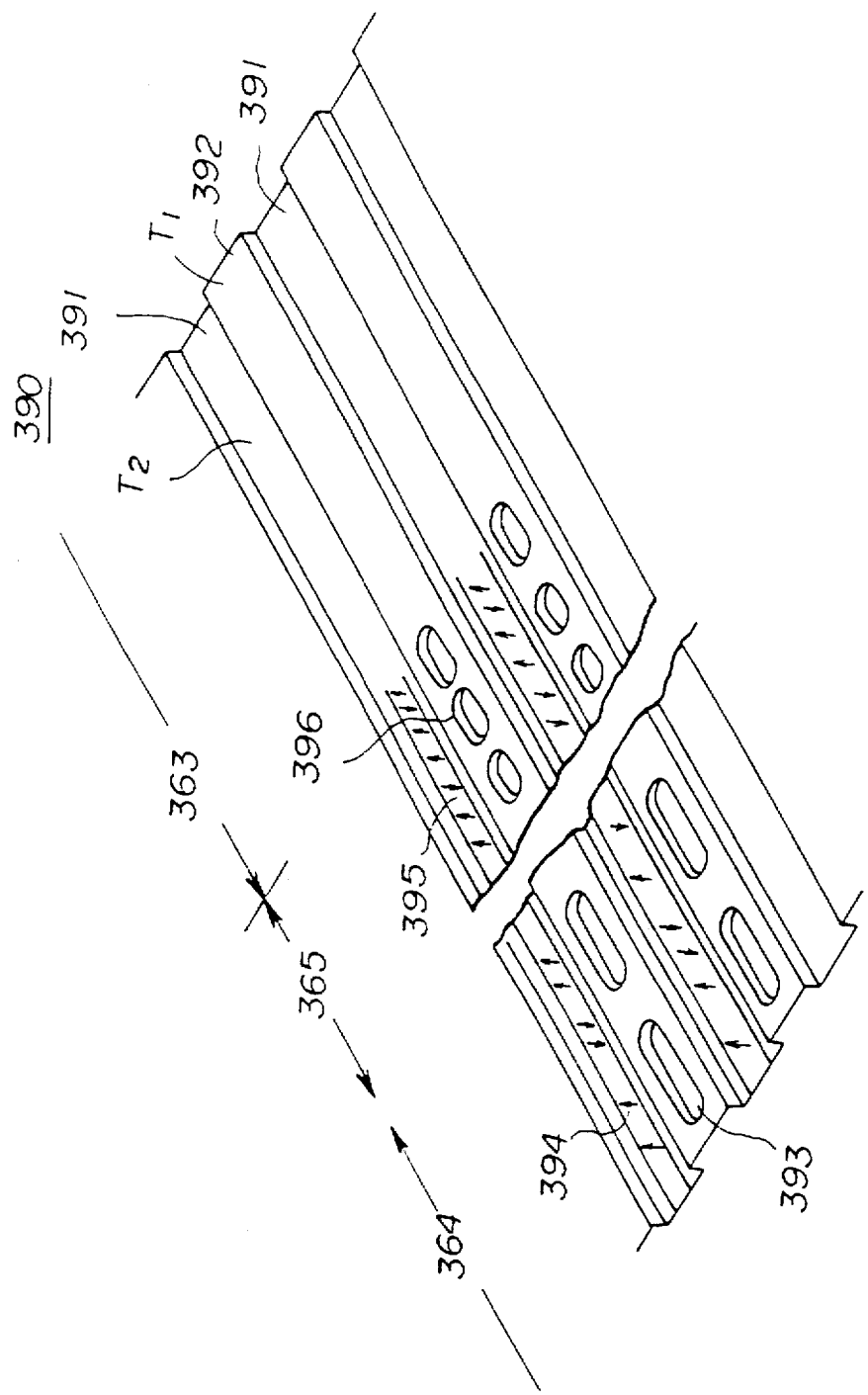
FIG. 27 is a perspective view showing an important part of an eighth embodiment of the optical disk according to the present invention.

Next, a description will be given of an eighth embodiment of the optical disk according to the present invention, by referring to FIG. 27. In FIG. 27, those parts which are the same as those corresponding parts in FIG. 23 are designated by the same reference numerals, and a description thereof will be omitted.

In a magneto-optic disk 390 shown in FIG. 27, a guide groove 391 extends from the data write region 363 and reaches the SM write region 364 and the ID write region 364. The guide groove 391 forms the track $T_1$, and a land 392 forms the track $T_2$.

In the Sm write region 364, a sequence of the SM pits 393 is provided in the track $T_1$, and SM magneto-optic recording 394 is provided in the track $T_2$.

On the other hand, in the ID write region 365, a sequence of ID pits 395 is provided in the track $T_1$, similarly to the SM recording region 364, and an ID magneto-optic recording 396 is provided in the track $T_2$. The recording format of the magneto-optic disk 390 is shown in FIG. 30.

On the other hand, the crosstalk of this magneto-optic disk 390 is shown in FIG. 31. With regard to the ID write region 365, the crosstalk from the ID pits 396 of the track $T_1$ was −34 dB, and the crosstalk from the ID magneto-optic recording 395 of the track $T_2$ was −43 dB as shown in FIG. 31. The crosstalk at the data write region 363 was −33 dB.

Figure 28:
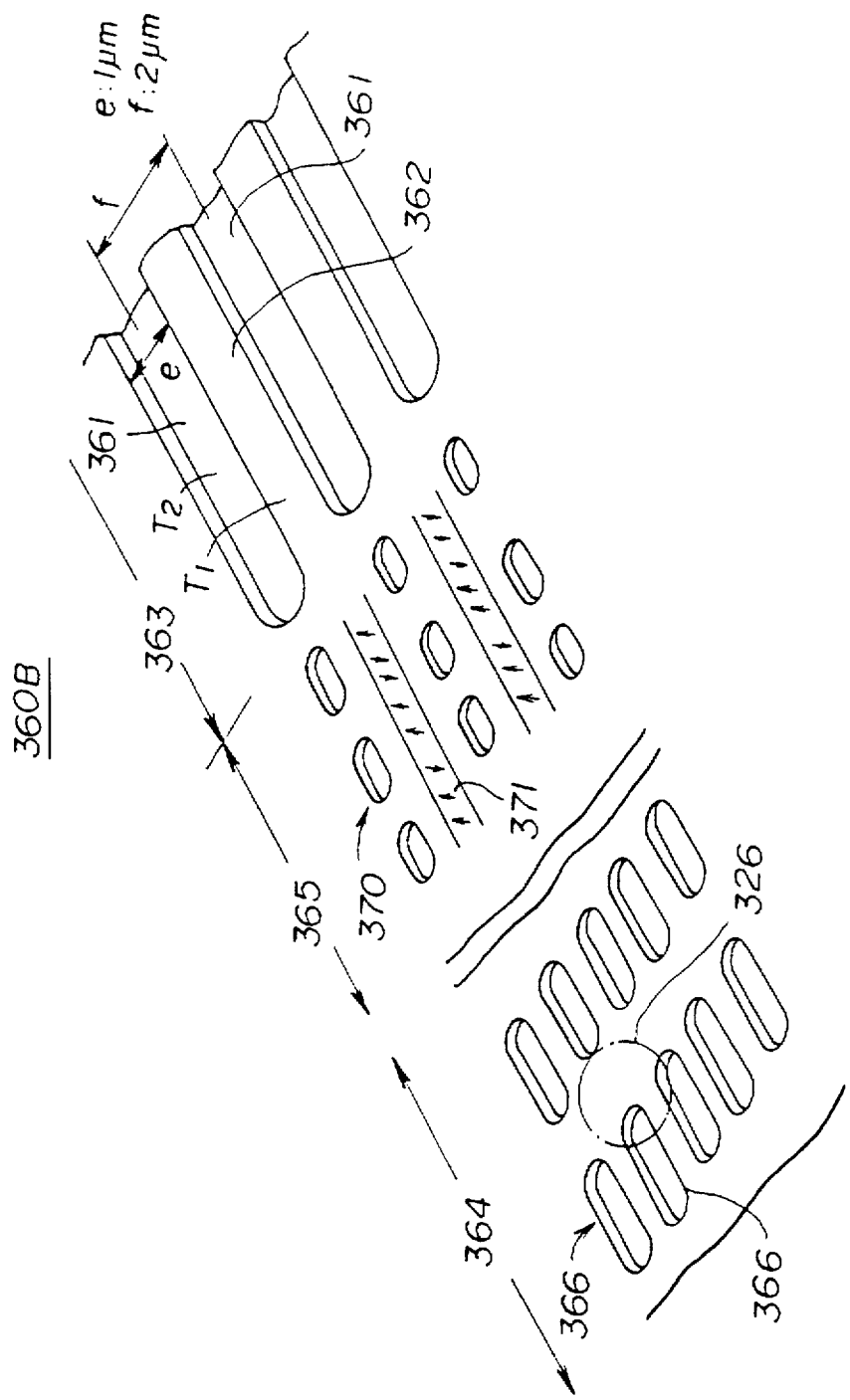
FIG. 28 is a perspective view showing an important part of a ninth embodiment of the optical disk according to the present invention.

Next, a description will be given of a ninth embodiment of the optical disk according to the present invention, by referring to FIG. 28. In FIG. 28, those parts which are the same as those corresponding parts in FIG. 23 are designated by the same reference numerals, and a description thereof will be omitted.

In a magneto-optic disk 360B shown in FIG. 28, the SM write region 364 is provided with the sequence of SM pits 366 also for the track $T_1$. The ID write region 365 of the magneto-optic disk 360B is the same as that of the magneto-optic disk 360 shown in FIG. 23.

The recording format of the magneto-optic disk 360B is shown in FIG. 30.

On the other hand, the crosstalk of this magneto-optic disk 360B is shown in FIG. 31. With regard to the ID write region 365, the crosstalk from the ID pits 370 of the track $T_2$ was −32 dB, and the crosstalk from the ID magneto-optic recording 371 of the track T, was −41 dB as shown in FIG. 31. The crosstalk at the data write region 363 was −34 dB.

Figure 29:
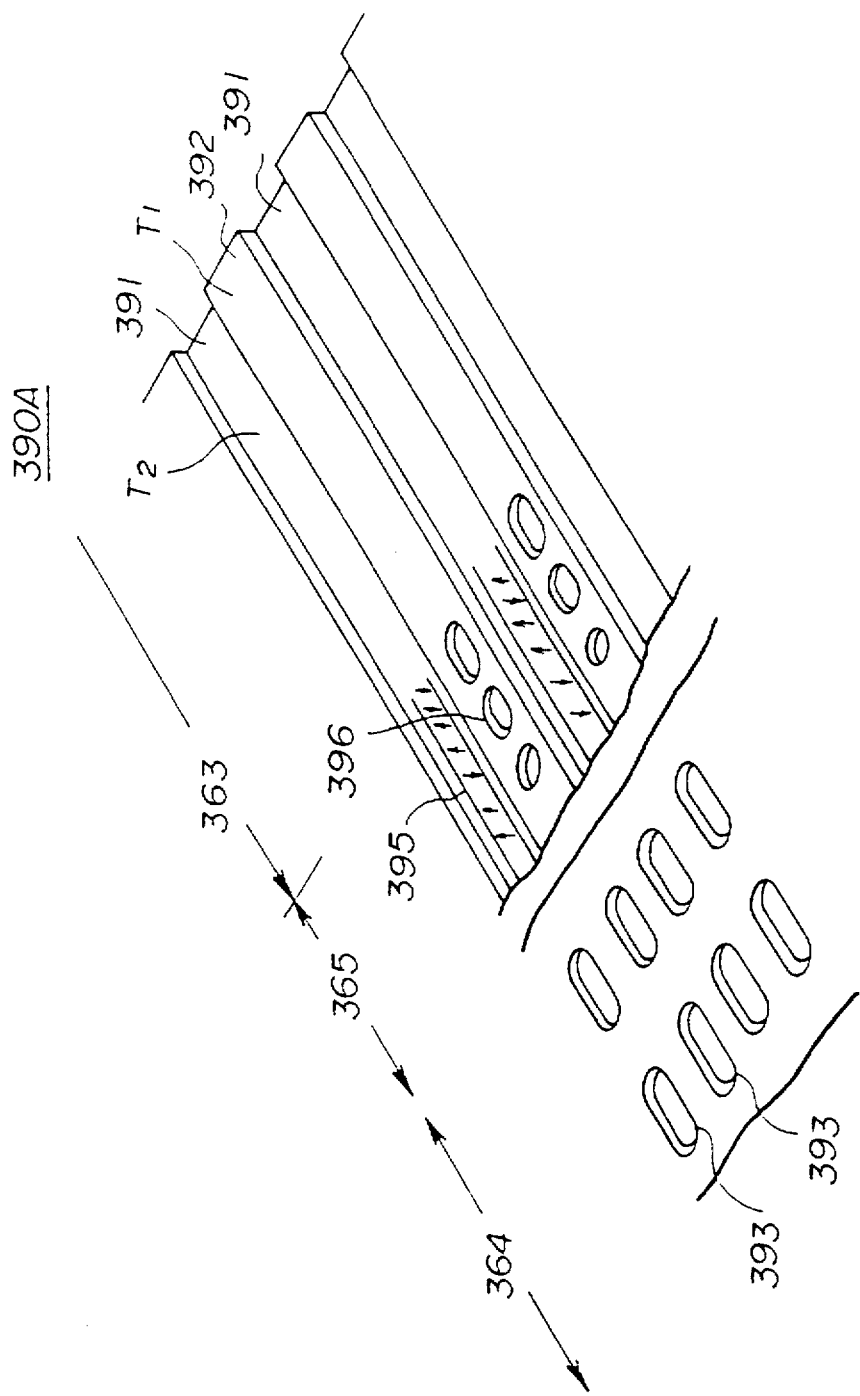
FIG. 29 is a perspective view showing an important part of a tenth embodiment of the optical disk according to the present invention.

Next, a description will be given of a tenth embodiment of the optical disk according to the present invention, by referring to FIG. 29. In FIG. 29, those parts which are the same as those corresponding parts in FIG. 27 are designated by the same reference numerals, and a description thereof will be omitted.

In a magneto-optic disk 390A shown in FIG. 29, the SM write region 364 is made grooveless also for the track $T_2$, and a sequence of SM pits 393 is provided in this track $T_2$. The ID write region 365 is the same as that of the magneto-optic disk 390 shown in FIG. 27.

The recording format of the magneto-optic disk 390A is shown in FIG. 30.

On the other hand, the crosstalk of this magneto-optic disk 390A is shown in FIG. 31. With regard to the ID write region 365, the crosstalk from the ID pits 396 of the track $T_1$ was −34 dB, and the crosstalk from the ID magneto-optic recording 395 of the track $T_2$ was −42 dB as shown in FIG. 31. The crosstalk at the data write region 363 was −33 dB.

Accordingly, it can be seen from FIG. 31 that the ID can be correctly detected without error from any of the sixth through tenth embodiments of the optical disk (that is, the magneto-optic disks 360, 360A, 390, 360B and 390A).

Figure 32:
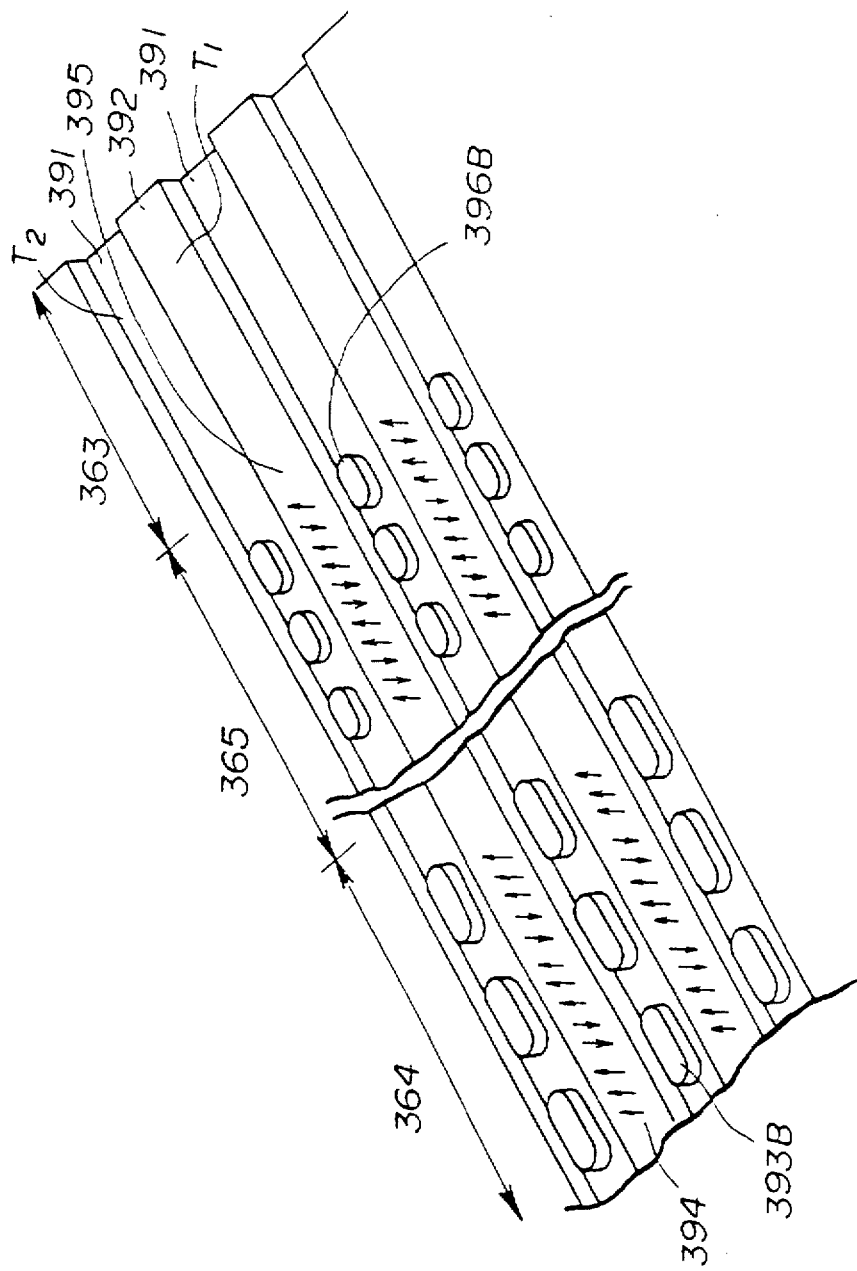
FIG. 32 is a perspective view showing an important art of an eleventh embodiment of the optical disk according to the present invention.

Next, a description will be given of an eleventh embodiment of the optical disk according to the present invention, by referring to FIG. 32. In FIG. 32, those parts which are the same as those corresponding parts in FIG. 27 are designated by the same reference numerals, and a description thereof will be omitted.

In a magneto-optic disk 390B shown in FIG. 32, the ID magneto-optic recording 395 in the ID write region 365 is provided on the land 392 of the track $T_1$. In addition, a sequence of ID projections 396B in the ID write region 365 is provided in the guide groove 391 of the track $T_2$.

Similarly, the SM magneto-optic recording 394 in the SM write region 364 is provided on the land 392 of the track $T_1$. In addition, a sequence of SM projections 393B in the SM write region 364 is provided in the guide groove 391 of the track $T_2$.

In other words, projections 393B and 396B are provided in place of the pits 393 and 396 of the magneto-optic disk 390 shown in FIG. 27.

This magneto-optic disk 390B can be produced by the optical disk producing method described with reference to FIG. 24, for example, similarly to the magneto-optic disk 390. But when producing the magneto-optic disk 390B, a negative type photoresist is used in place of the positive type photoresist which is used to produce the magneto-optic disk 390, so that it is possible to form the SM projections 393B and the ID projections 396B.

Of course, each of the embodiments of the optical disk can be appropriately combined with another embodiment of the optical disk so as to obtain the advantageous effects of the two combined embodiments.

Next, a description will be given of a twelfth embodiment of the optical disk according to the present invention, by referring to FIGS. 33A and 33B. In this embodiment, the present invention is applied to a magneto-optic disk.

Figure 33A:
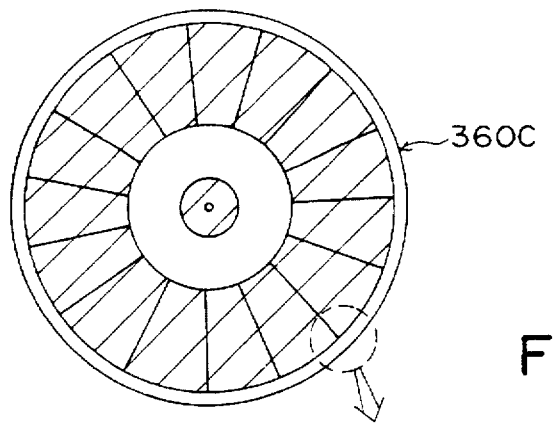
FIGS. 33A and 33B respectively are a plan view and a perspective view showing a twelfth embodiment of the optical disk according to the present invention.
Figure 33B:
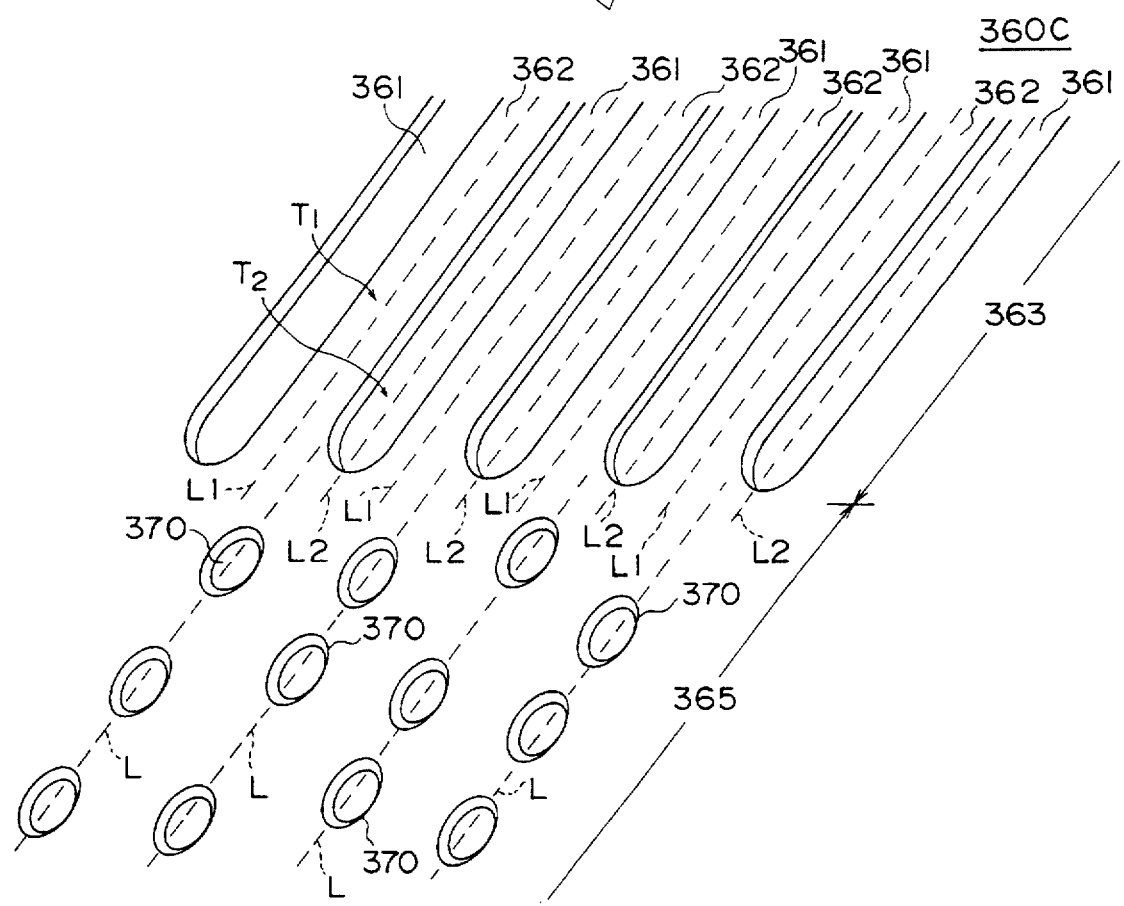

FIG. 33A shows a plan view of an optical disk 360C, and FIG. 33B shows a perspective view of an important part of the optical disk 360C encircled in FIG. 33A on an enlarged scale. In FIGS. 33A and 33B, those parts which are the same as those corresponding parts in FIG. 23 are designated by the same reference numerals, and a description thereof will be omitted.

The magneto-optic disk 360C shown in FIGS. 33A and 33B includes a guide groove 361, and a land 362 which is provided between two mutually adjacent guide grooves 361. The land 362 forms a track $T_1$, and the guide groove 361 forms a track $T_2$. A magnetic layer (not shown) which is magnetized in the perpendicular direction is formed on the entire top surface of the magneto-optic disk 360C. The top surface of the magneto-optic disk 360C includes a data write region 363, a SM write region (not shown) and an ID write region 365.

The SM may be written in the SM write region of the tracks $T_1$ and $T_2$ according to any of the recording methods employed in the embodiments of the optical disk described above.

On the other hand, in the ID write region 365, the ID (address) is written between the tracks $T_1$ and $T_2$ in the form of a pit sequence which is made up of ID pits 370. In this embodiment, the ID is recorded along an imaginary line L which is located approximately at a center between center lines $L_1$ and L2 of the tracks $T_1$ and $T_2$. As a result, the ID is used in common for the two mutually adjacent tracks $T_1$ and $T_2$, and the pitch of the tracks $T_1$ and $T_2$ can be minimized, thereby further improving the recording density of the magneto-optic disk 360C.

However, because the same ID is used in common between the two mutually adjacent tracks $T_1$ and $T_2$, it is not possible to determine from the ID alone the track and the sector, because two tracks and sectors are specified by the same ID. Accordingly, an identification bit is added to the ID in the optical disk unit, as will be described later in conjunction with a third embodiment of the optical disk unit according to the present invention.

In the data write region 363, the data is written by the magneto-optic recording on each of the tracks $T_1$ and $T_2$.

Of course, the imaginary line L on which the ID pits 370 are provided in the form of the pit sequence does not have to be located approximately at the center between the center lines L1 and L2 of the two mutually adjacent tracks $T_1$ and $T_2$. The imaginary line L may be located between the center lines L1 and L2 of the two mutually adjacent tracks $T_1$ and $T_2$ as long as the ID pits 370 can be scanned when scanning either of the tracks $T_1$ and $T_2$.

Next, a description will be given of a thirteenth embodiment of the optical disk according to the present invention, by referring to FIGS. 34A and 34B. In this embodiment, the present invention is applied to a magneto-optic disk.

Figure 34A:
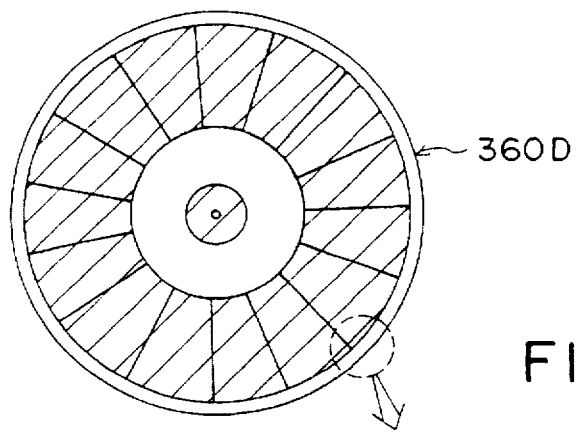
FIGS. 34A and 34B respectively are a plan view and a perspective view showing a thirteenth embodiment of the optical disk according to the present invention.
Figure 34B:
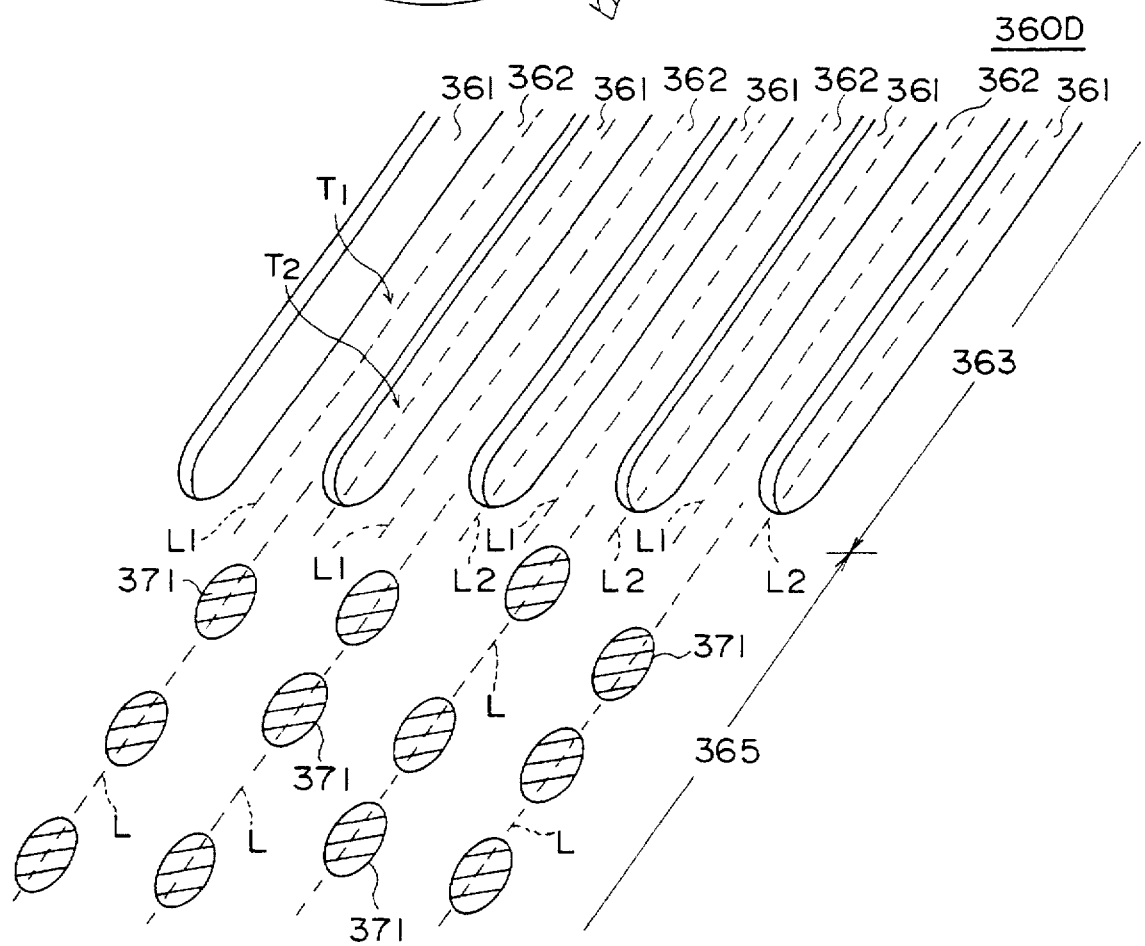

FIG. 34A shows a plan view of an optical disk 360D, and FIG. 34B shows a perspective view of an important part of the optical disk 360D encircled in FIG. 34A on an enlarged scale. In FIGS. 34A and 34B, those parts which are the same as those corresponding parts in FIG. 23 are designated by the same reference numerals, and a description thereof will be omitted.

The magneto-optic disk 360D shown in FIGS. 34A and 34B includes a guide groove 361, and a land 362 which is provided between two mutually adjacent guide grooves 361. The land 362 forms a track $T_1$, and the guide groove 361 forms a track $T_2$. A magnetic layer (not shown) which is magnetized in the perpendicular direction is formed on the entire top surface of the magneto-optic disk 360D. The top surface of the magneto-optic disk 360D includes a data write region 363, a SM write region (not shown) and an ID write region 365.

The SM may be written in the SM write region of the tracks $T_1$ and $T_2$ according to any of the recording methods employed in the embodiments of the optical disk described above.

On the other hand, in the ID write region 365, the ID (address) is written between the tracks $T_1$ and $T_2$ in the form of a recording sequence which is made up of ID magneto-optic recording portions 371. In this embodiment, the ID is recorded along an imaginary line L which is located approximately at a center between center lines L1 and L2 of the tracks $T_1$ and $T_2$. As a result, the ID is used in common for the two mutually adjacent tracks $T_1$ and $T_2$, and the pitch of the tracks $T_1$ and $T_2$ can be minimized, thereby further improving the recording density of the magneto-optic disk 360D.

However, because the same ID is used in common between the two mutually adjacent tracks $T_1$ and $T_2$, it is not possible to determine from the ID alone the track and the sector, because two tracks and sectors are specified by the same ID. Accordingly, an identification bit is added to the ID in the optical disk unit, as will be described later in conjunction with the third embodiment of the optical disk unit according to the present invention.

In the data write region 363, the data is written by the magneto-optic recording on each of the tracks $T_1$ and $T_2$.

Of course, the imaginary line L on which the ID magneto-optic recording portions 371 are provided in the form of the recording sequence does not have to be located approximately at the center between the center lines L1 and L2 of the two mutually adjacent tracks $T_1$ and $T_2$. The imaginary line L may be located between the center lines L1 and L2 of the two mutually adjacent tracks $T_1$ and $T_2$ as long as the ID magneto-optic recording portions 371 can be scanned when scanning either of the tracks $T_1$ and $T_2$.

Next, a description will be given of a fourteenth embodiment of an optical disk according to the present invention, by referring to FIGS. 35A and 35B.

Figure 35A:
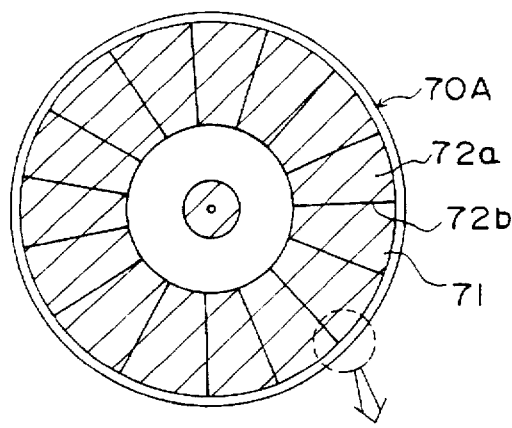
FIGS. 35A and 35B respectively are a plan view and a perspective view showing a fourteenth embodiment of the optical disk according to the present invention.
Figure 35B:
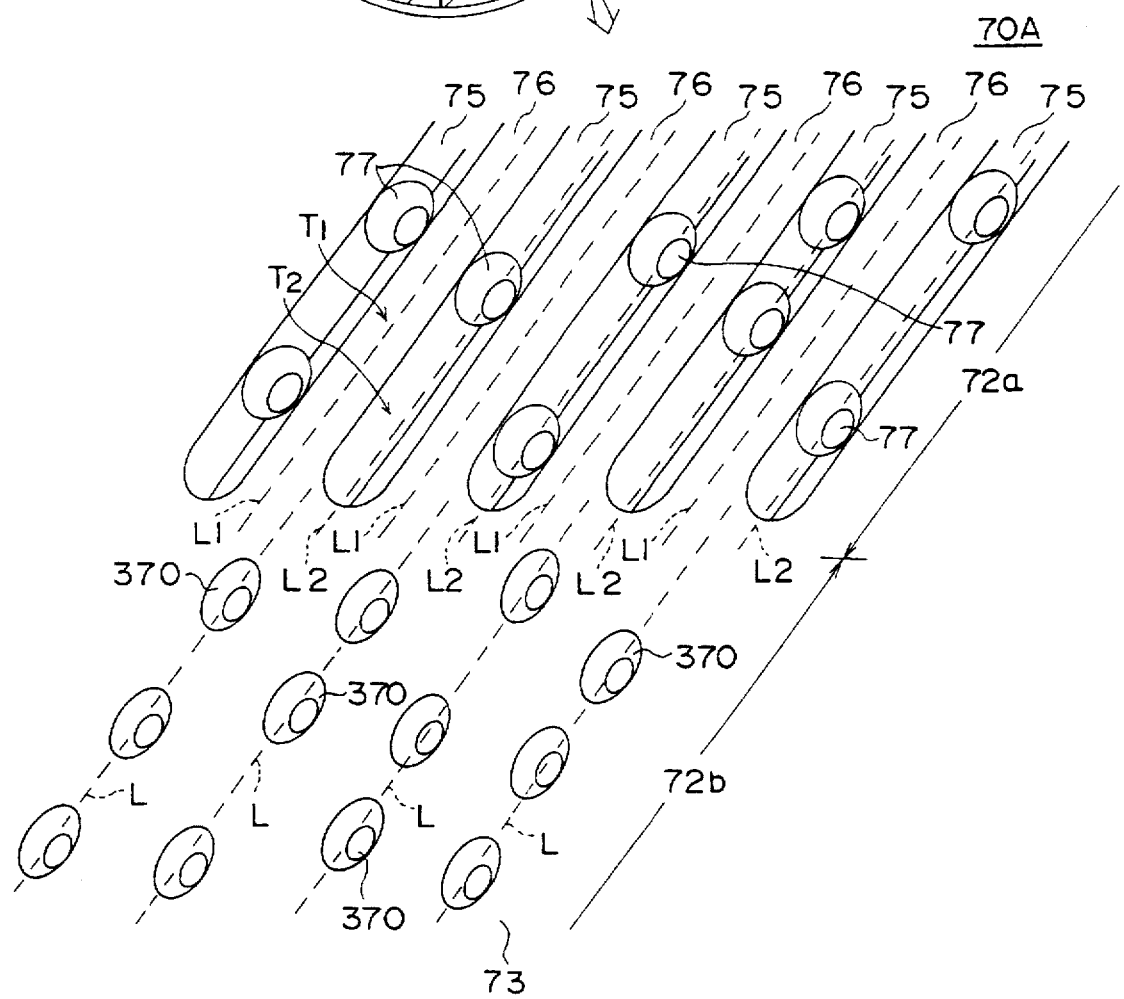

FIG. 35A shows a perspective view of an optical disk 70A, and FIG. 35B shows an important part of the optical disk 70A encircled in FIG. 35A on an enlarged scale. In FIGS. 35A and 35B, those parts which are the same as those corresponding parts in FIGS. 11A and 11B are designated by the same reference numerals, and a description thereof will be omitted.

In FIG. 35A, ROM information is written in a write surface 71 of the optical disk 70A. In addition, a region 72a with respect to which arbitrary information is written to and read from and a preformat region 72b are periodically arranged on the optical disk 70A.

As shown in FIG. 35B, the region 72a includes a continuous groove 75 which has a constant depth and a V-shaped cross section, for example. This continuous groove 75 forms the head guide track 61 described above which is made up of a single continuous track or concentric tracks such that track turns of the continuous groove 75 are arranged at a constant track pitch. The region 72a also includes a land 76 between two mutually adjacent continuous grooves 75. This land 76 forms the writable region 62 described above.

One track turn of the land 76 forms a track $T_1$, and one track turn of the continuous groove 75 forms a track $T_2$ which is adjacent to the track $T_1$.

In addition, ROM information is preformed within the continuous groove 75 in the form of intermittent pits 77 having a predetermined depth different from that of the continuous groove 75. The pits 77 are preformed during the production stage of the optical disk 70. The intermittent pits 77 form the preformed track 63 described above.

The continuous groove 75, the land 76 and the pits 77 are respectively formed on a substrate 73 via a recording layer which is made of a magneto-optic material.

In the preformat region 72b, the ID (address) is written between the tracks $T_1$ and $T_2$ in the form of a pit sequence which is made up of ID pits 370. In this embodiment, the ID is recorded along an imaginary line L which is located approximately at a center between center lines L1 and L2 of the tracks $T_1$ and $T_2$. As a result, the ID is used in common for the two mutually adjacent tracks $T_1$ and $T_2$, and the pitch of the tracks $T_1$ and $T_2$ can be minimized, thereby further improving the recording density of the optical disk 70A.

However, because the same ID is used in common between the two mutually adjacent tracks $T_1$ and $T_2$, it is not possible to determine from the ID alone the track and the sector, because two tracks and sectors are specified by the same ID. Accordingly, an identification bit is added to the ID in the optical disk unit, as will be described later in conjunction with a third embodiment of the optical disk unit according to the present invention.

Of course, the imaginary line L on which the ID pits 370 are provided in the form of the pit sequence does not have to be located approximately at the center between the center lines L1 and L2 of the two mutually adjacent tracks $T_1$ and $T_2$. The imaginary line L may be located between the center lines L1 and L2 of the two mutually adjacent tracks $T_1$ and $T_2$ as long as the ID pits 370 can be scanned when scanning either of the tracks $T_1$ and $T_2$.

Next, a description will be given of a fifteenth embodiment of an optical disk according to the present invention, by referring to FIGS. 36A and 36B.

Figure 36A:
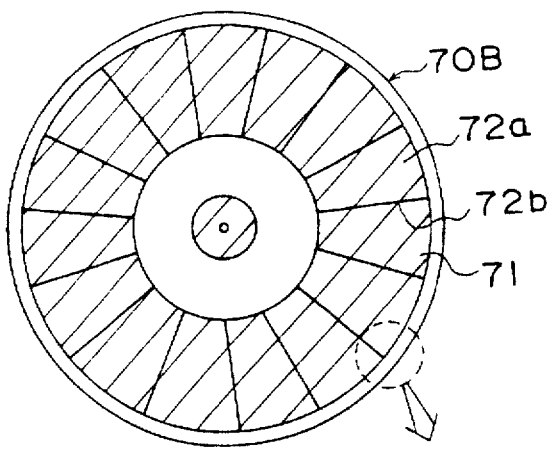
FIGS. 36A and 36B respectively are a plan view and a perspective view showing a fifteenth embodiment of the optical disk according to the present invention.
Figure 36B:
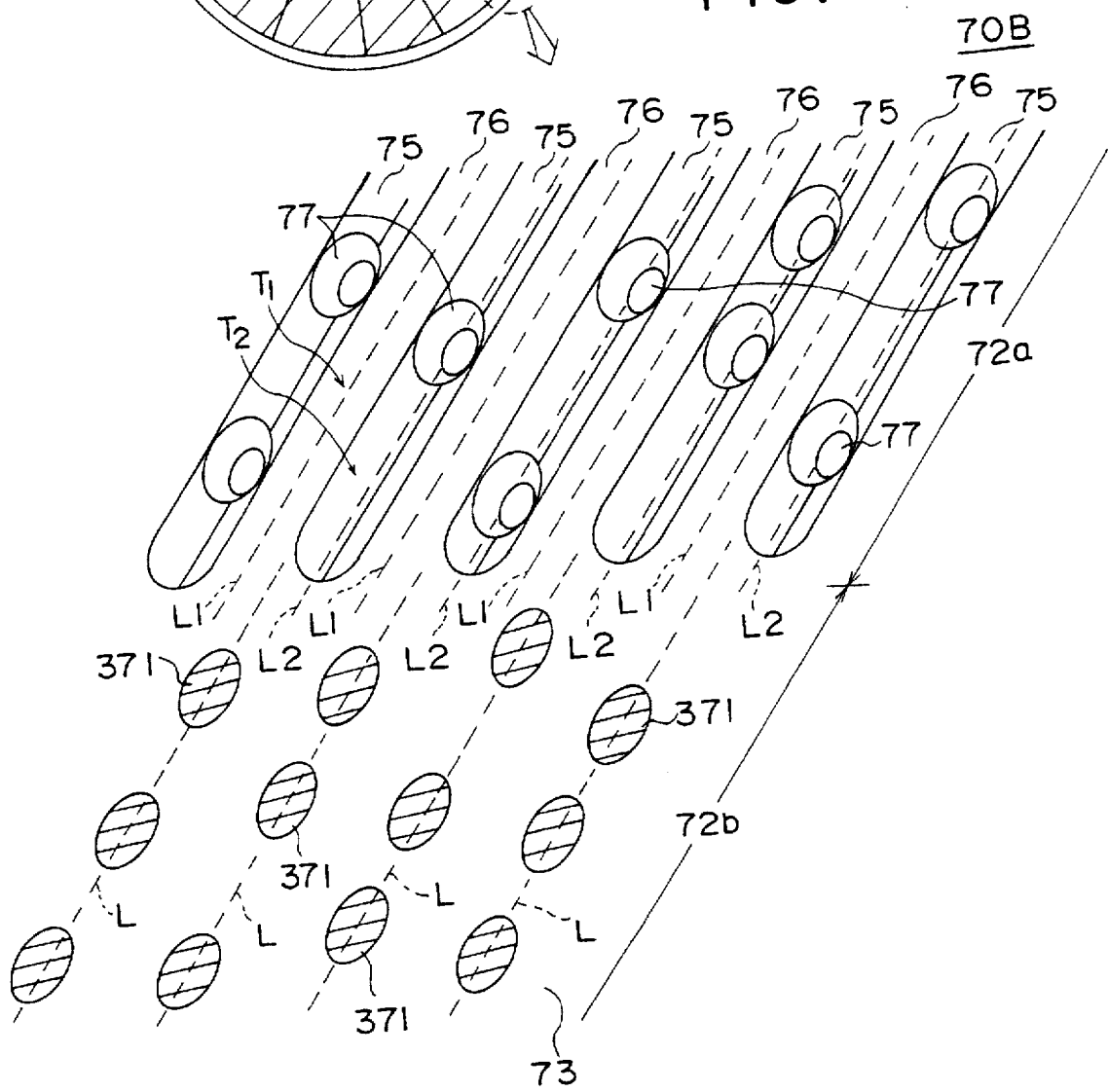

FIG. 36A shows a perspective view of an optical disk 70B, and FIG. 36B shows an important part of the optical disk 70B encircled in FIG. 36A on an enlarged scale. In FIGS. 36A and 36B, those parts which are the same as those corresponding parts in FIGS. 11A and 11B are designated by the same reference numerals, and a description thereof will be omitted.

In FIG. 36A, ROM information is written in a write surface 71 of the optical disk 70B. In addition, a region 72a with respect to which arbitrary information is written to and read from and a preformat region 72b are periodically arranged on the optical disk 70B.

As shown in FIG. 36B, the region 72a includes a continuous groove 75 which has a constant depth and a V-shaped cross section, for example. This continuous groove 75 forms the head guide track 61 described above which is made up of a single continuous track or concentric tracks such that track turns of the continuous groove 75 are arranged at a constant track pitch. The region 72a also includes a land 76 between two mutually adjacent continuous grooves 75. This land 76 forms the writable region 62 described above.

One track turn of the land 76 forms a track $T_1$, and one track turn of the continuous groove 75 forms a track $T_2$ which is adjacent to the track $T_1$.

In addition, ROM information is preformed within the continuous groove 75 in the form of intermittent pits 77 having a predetermined depth different from that of the continuous groove 75. The pits 77 are preformed during the production stage of the optical disk 70. The intermittent pits 77 form the preformed track 63 described above.

The continuous groove 75, the land 76 and the pits 77 are respectively formed on a substrate 73 via a recording layer which is made of a magneto-optic material.

In the preformat region 72b, the ID (address) is written between the tracks $T_1$ and $T_2$ in the form of a recording sequence which is made up of ID magnetooptic recording portions 371. In this embodiment, the ID is recorded along an imaginary line L which is located approximately at a center between center lines L1 and L2 of the tracks $T_1$ and $T_2$. As a result, the ID is used in common for the two mutually adjacent tracks $T_1$ and $T_2$, and the pitch of the tracks $T_1$ and $T_2$ can be minimized, thereby further improving the recording density of the optical disk 70B.

However, because the same ID is used in common between the two mutually adjacent tracks $T_1$ and $T_2$, it is not possible to determine from the ID alone the track and the sector, because two tracks and sectors are specified by the same ID. Accordingly, an identification bit is added to the ID in the optical disk unit, as will be described later in conjunction with a third embodiment of the optical disk unit according to the present invention.

Of course, the imaginary line L on which the ID magneto-optic recording portions 371 are provided in the form of the recording sequence does not have to be located approximately at the center between the center lines L1 and L2 of the two mutually adjacent tracks $T_1$ and $T_2$. The imaginary line L may be located between the center lines L1 and L2 of the two mutually adjacent tracks $T_1$ and $T_2$ as long as the ID magneto-optic recording portions 371 can be scanned when scanning either of the tracks $T_1$ and $T_2$.

Next, a description will be given of the third embodiment of the optical disk unit according to the present invention, by referring to FIGS. 37 and 38.

Figure 37:
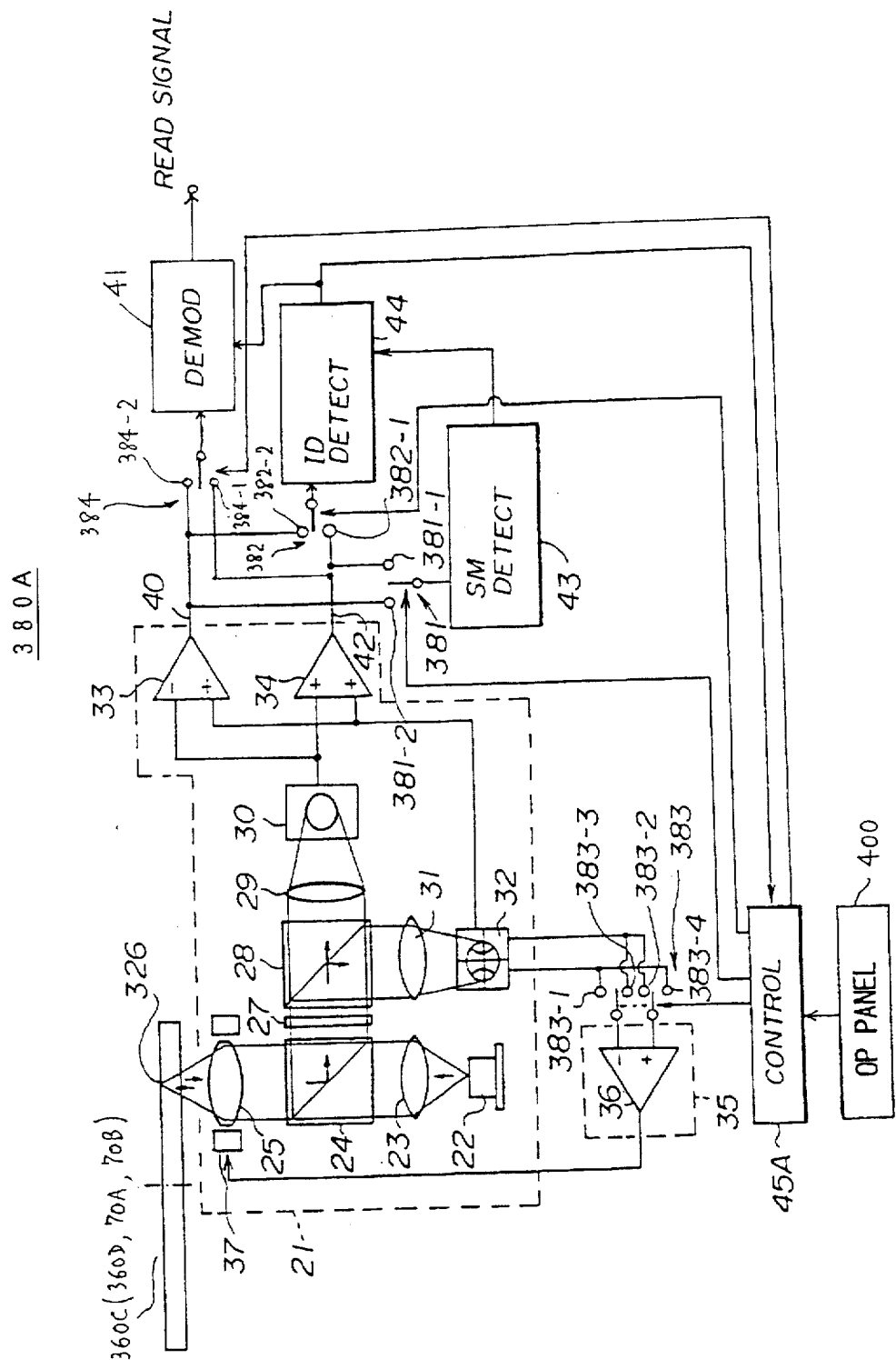
FIG. 37 is a system block diagram showing a third embodiment of the optical disk unit according to the present invention.
Figure 38:
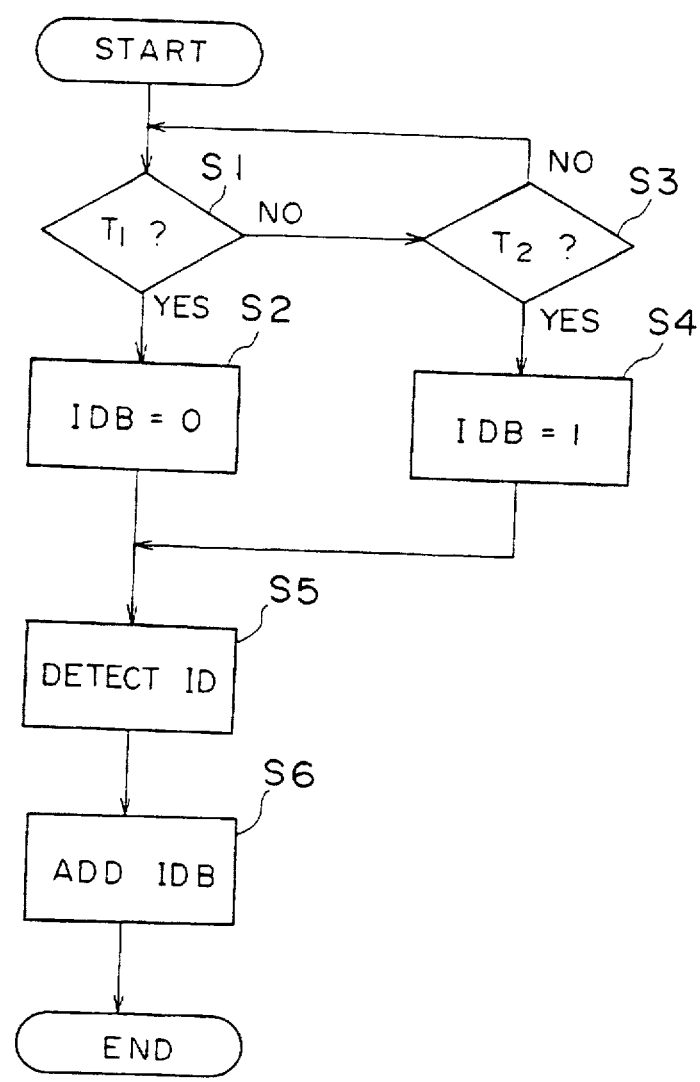
FIG. 38 is a flow chart for explaining an operation of a controller shown in FIG. 37.

FIG. 37 is a system block diagram showing the third embodiment of the optical disk unit, and FIG. 38 is a flow chart for explaining an operation of a controller of the optical disk unit. In FIG. 37, those parts which are the same as those corresponding parts in FIG. 25 are designated by the same reference numerals, and a description thereof will be omitted.

An optical disk unit 380A includes a switch 384 in addition to those elements of the optical disk unit 380 shown in FIG. 25. In addition, an operation panel 40 is connected to the controller 45A. This controller 45A also controls the switch 384. This optical disk unit 380A is adapted to play the disks 360C, 360D, 70A and 70B described above.

The switch 384 is provided at the input stage of the demodulator 41. This switch 384 inputs the magneto-optic signal 40 to the demodulator 41 when connected to a contact 384-1, and inputs the reflectance signal 42 to the demodulator 41 when connected to a contact 384-2. The connection of this switch 384 is controlled by the controller 45A.

When playing any one of the disks 360C, 360D, 70A and 70B described above, it is not possible to determine from the ID alone the track and the sector, because the same ID is used in common between the two mutually adjacent tracks $T_1$ and $T_2$, and the two tracks and sectors are specified by the same ID. Accordingly, an identification bit IDB is added to the ID in the controller 45A of the optical disk unit 380A.

FIG. 38 shows the operation of the controller 45A for adding the identification bit IDB to the ID that is read from one of the disks 360C, 360D, 70A and 70B. For the sake of convenience, it will be assumed that the magneto-optic disk 360C is played on the optical disk unit 380A. In FIG. 38, a step S1 decides whether or not the track of the magneto-optic disk 360C being scanned (or tracked) is the track $T_1$, based on the connection of the switch 383. If the decision result in the step S1 is YES, a step S2 resets the identification bit IDB to "0". On the other hand, if the decision result in the step S1 is NO, a step S3 decides whether or not the track being scanned is the track $T_2$, based on the connection of the switch 383. The process returns to the step S1 if the decision result in the step S3 is NO.

On the other hand, if the decision result in the step S3 is YES, a step S4 sets the identification bit IDB to "1". After the step S2 or S4, a step S5 detects the ID that is read from the disk 390C, based on the output of the ID detector 44. Then, a step S6 adds the identification bit IDB to the detected ID. Accordingly, the controller 45A can recognize the exact track and sector that is presently being scanned based on the detected ID which is added with the identification bit IDB.

Therefore, after the step S6, it is possible to carry out known processes such as searching for a desired track and sector position on the magneto-optic disk 390C. In the case of a searching process, for example, a difference between the present position that is detected based on the ID added with the identification bit IDB. Then, the tracking servo is turned OFF, and the optical head 21 is driven to scan a position in a vicinity of a target track. Thereafter, the switch 383 is controlled depending on the value of the identification bit IDB, and the tracking servo is turned ON to read the ID from the magneto-optic disk 390C.

Therefore, it is possible to share the same ID in common between two mutually adjacent tracks, and yet enable detection of the exact track and sector position being scanned.

In this embodiment, the user inputs type information related to the type of disk that is going to be played on the optical disk unit 380A from the operation panel 400. Hence, the controller 45A controls the connection of the switches 381, 382 and 284 depending on the type information received from the operation panel 400.

When the magneto-optic disk 390C is played, the ID is detected as the reflectance, and the signal is detected as the magneto-optic signal. Hence, in this case, the controller 45A controls the switch 381 to connect to the contact 381-1, the switch 0.382 to connect to the contact 382-1, and the switch 384 to connect to the contact 384-2.

On the other hand, when the magneto-optic disk 390D is played, the ID is detected as the magneto-optic signal, and the signal is detected as the magneto-optic signal. Hence, in this case, the controller 45A controls the switch 381 to connect to the contact 381-2, the switch 382 to connect to the contact 382-2, and the switch 384 to connect to the contact 384-2.

In addition, the optical disk 70A is played, the ID is detected as the reflectance, and the signal is detected as the magneto-optic signal or the reflectance. Hence, in this case, the controller 45A controls the switch 381 to connect to the contact 3811, the switch 382 to connect to the contact 382-1, and the switch 384 to connect to the contact 384-2 or 384-1 depending on whether the signal is read as the magneto-optic signal or the reflectance.

Similarly, the optical disk 70B is played, the ID is detected as the magneto-optic signal, and the signal is detected as the magneto-optic signal or the reflectance. Hence, in this case, the controller 45A controls the switch 381 to connect to the contact 381-2, the switch 382 to connect to the contact 382-s, and the switch 384 to connect to the contact 384-2 or 384-1 depending on whether the signal is read as the magneto-optic signal or the reflectance.

Of course, if the optical disk unit 380A only needs to play one type of disk, the switch 384 may be omitted, and a corresponding fixed connection may be employed to realize the above operation. In this case, it is unnecessary for the user to input the type information from the operation panel 400.

Further, the present invention is not limited to these embodiments, but various variations and modifications may be made without departing from the scope of the present invention.

What is claimed is:

1. An optical disk comprising:
    a disk-shaped substrate having a surface;
    a first track and a second track provided on the surface of the substrate, said first and second tracks being two mutually adjacent concentric tracks or two mutually adjacent track turns of a single spiral track, said first track extending along a first center line, said second track extending along a second center line; and
    an identification signal recording part extending along a third center line and prerecorded with an identification signal including at least a sector number and a track number for identifying a position on the optical disk, said third center line being arranged between the first and second center lines,
    said identification signal prerecorded in said identification signal recording part being used in common for said first and second tracks on both sides of said identification signal recording part,
    wherein the first track and the second track are information storable regions.

2. The optical disk as claimed in claim 1, wherein said third center line is arranged at a center between the first and second center lines.

3. The optical disk as claimed in claim 1, wherein said identification signal is prerecorded in said identification signal recording part as variations in topological feature.

4. The optical disk as claimed in claim 3, wherein said variations in topological feature comprise a sequence of intermittent pits provided on the surface of said substrate.

5. The optical disk as claimed in claim 3, which further comprises:
    a land extending along said first center line and forming said first track; and
    a groove extending along said second center line and forming said second track.

6. The optical disk as claimed in claim 5, wherein:
    said surface of said substrate includes a plurality of data write regions extending in a radial direction of said substrate, and a preformat region extending in the radial direction of said substrate and arranged between two adjacent data write regions,
    said identification signal recording part is provided in said preformat region, and
    said land and said groove are provided in said data write region.

7. The optical disk as claimed in claim 5, which further comprises:
    read-only information prerecorded in said groove as variations in topological feature.

8. The optical disk as claimed in claim 6, wherein signals are written to and read from said first and second tracks using a magneto-optic recording technique.

9. The optical disk as claimed in claim 1, wherein said identification signal is prerecorded in said identification signal recording part as magneto-optic signals.

10. The optical disk as claimed in claim 9, which further comprises:
    a land extending along said first center line and forming said first track; and
    a groove extending along said second center line and forming said second track.

11. The optical disk as claimed in claim 10, wherein:
    said surface of said substrate includes a plurality of data write regions extending in a radial direction of said substrate, and a preformat region extending in the radial direction of said substrate and arranged between two adjacent data write regions,
    said identification signal recording part is provided in said preformat region, and
    said land and said groove are provided in said data write region.

12. The optical disk as claimed in claim 10, which further comprises:
    read-only information prerecorded in said groove as variations in topological feature.

13. The optical disk as claimed in claim 11, wherein signals are written to and read from said first and second tracks using a magneto-optic recording technique.

14. An optical disk unit adapted to write and read information to and from an optical disk having a disk-shaped substrate, a first track and a second track provided on a surface of the substrate and formed by two mutually adjacent concentric tracks or two mutually adjacent track turns of a single spiral track, and an identification signal recording part provided between the first and second tracks and prerecorded with an identification signal including at least a sector number and a track number for identifying a position on the optical disk, said identification signal prerecorded in said identification signal recording part being used in common for said first and second tracks on both sides of said identification signal recording part, said optical disk unit comprising:
    first means for detecting the identification signal from the optical disk;

second means for determining whether a scanned track is said first track or said second track; and third means for adding an identification information to the identification signal detected by said first means based on the scanned track determined by said second means, wherein the first track and the second track are information storable regions.

15. The optical disk unit as claimed in claim 14, wherein said third means adds an identification bit having different values for the first and second tracks as said identification information.

16. The optical disk unit as claimed in claim 14, wherein said first means detects the identification signal as reflectance information obtained from the optical disk.

17. The optical disk unit as claimed in claim 14, wherein said first means detects the identification signal as magneto-optic signals obtained from the optical disk.

18. The optical disk unit as claimed in claim 14, wherein:

the optical disk has a land forming the first track and a groove forming the second track, and said second means detects the first and second tracks based on a light reflected from the land and the groove.

19. An optical disk comprising:

a disk-shaped substrate having a surface;

a first track and a second track provided on the surface of the substrate, said first and second tracks being two mutually adjacent concentric tracks or two mutually adjacent track turns of a single spiral track, said first track extending along a first center line, said second track extending along a second center line;

an identification signal recording part extending along a third center line and prerecorded with an identification signal including at least a sector number and a track number for identifying a position on the optical disk;

a land extending along said first center line and forming said first track; and a groove extending along said second center line and forming said second track, said third center line being arranged between the first and second center lines, said identification signal prerecorded in said identification signal recording part being common to said first and second tracks on both sides of said identification signal recording part, wherein said identification signal is prerecorded in said identification signal recording part as variations in topological feature, wherein said surface of said substrate includes a plurality of data write regions extending in a radial direction of said substrate, and preformat region extending in the radial direction of said substrate and arranged between two adjacent data write regions, wherein said identification signal recording part is provided in said preformat region, and wherein said land and said groove are provided in said data write region.

20. The optical disk as claimed in claim 19, further comprising read-only information prerecorded in said groove as variations in topological feature.

21. The optical disk as claimed in claim 19, wherein signals are written to and read from said first and second tracks using a magneto-optic recording technique.

22. An optical disk comprising:

a disk-shaped substrate having a surface;

a first track and a second track provided on the surface of the substrate, said first and second tracks being two mutually adjacent concentric tracks or two mutually adjacent track turns of a single spiral track, said first track extending along a first center line, said second track extending along a second center line;

an identification signal recording part extending along a third center line and prerecorded with an identification signal including at least a sector number and a track number for identifying a position on the optical disk;

a land extending along said first center line and forming said first track; and a groove extending along said second center line and forming said second track, said third center line being arranged between the first and second center lines, said identification signal prerecorded in said identification signal recording part being common to said first and second tracks on both sides of said identification signal recording part, wherein said identification signal is prerecorded in said identification signal recording part as magneto-optic signals, wherein said surface of said substrate includes a plurality of data write regions extending in a radial direction of said substrate, and a preformat region extending in the radial direction of said substrate and arranged between two adjacent data write regions, wherein said identification signal recording part is provided in said preformat region, and wherein land and said groove are provided in said data write region.

23. The optical disk as claimed in claim 22, further comprising read-only information prerecorded in said groove as variation in topological feature.

24. The optical disk as claimed in claim 22, wherein signals are written to and read from said first and second tracks using a magneto-optic recording technique.

25. An optical disk comprising:

a disk-shaped substrate having a surface;

a first track and a second track provided on the surface of the substrate, said first and second tracks being two mutually adjacent concentric tracks or two mutually adjacent track turns of a single spiral track, said first track extending along a first center line, said second track extending along a second center line; and an identification signal recording part extending along a third center line and prerecorded with an identification signal including at least a sector number and a track number for identifying a position on the optical disk, said third center line being arranged between the first and second center lines, said identification signal prerecorded in said identification signal recording part being common to said first and second tracks on both sides of said identification signal recording part, wherein the first track and the second track are information storable regions, and wherein the first track is a land and the second track is a groove.

26. An optical disk unit adapted to write and read information to and from an optical disk having a disk-shaped substrate, a first track and a second track provided on a surface of the substrate and formed by two mutually adjacent concentric tracks or two mutually adjacent track turns of a single spiral track, and an identification signal recording part provided between the first and second tracks and prerecorded with an identification signal including at least a sector number and a track number for identifying a position on the optical disk, said identification signal prerecorded in said identification signal recording part being common to said first and second tracks on both sides of said identification signal recording part, said optical disk unit comprising:

first means for detecting the identification signal from the optical disk;

second means for determining whether a scanned track is said first track or said second track; and third means for adding an identification information to the identification signal detected by said first means based on the scanned track determined by said second means, wherein the first track and the second track are information storable regions, and wherein the first track is a land and the second track is a groove.

* * * * *